United States Patent
Eyal et al.

(10) Patent No.: US 9,763,046 B2
(45) Date of Patent: Sep. 12, 2017

(54) APPARATUS, SYSTEM AND METHOD OF FINE TIMING MEASUREMENT (FTM)

(71) Applicant: INTEL IP CORPORATION, Santa Clara, CA (US)

(72) Inventors: Elad Eyal, Shoham (IL); Jonathan Segev, Tel Mond (IL); Itai Steiner, Tel Aviv (IL); Shahar Michaelovich, Raanana (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/086,104

(22) Filed: Mar. 31, 2016

(65) Prior Publication Data

US 2017/0064505 A1  Mar. 2, 2017

Related U.S. Application Data

(60) Provisional application No. 62/210,963, filed on Aug. 27, 2015.

(51) Int. Cl.
| | |
|---|---|
| *H04W 4/02* | (2009.01) |
| *H04W 4/04* | (2009.01) |
| *H04L 9/32* | (2006.01) |
| *H04W 12/06* | (2009.01) |

(52) U.S. Cl.
CPC .......... *H04W 4/023* (2013.01); *H04L 9/3271* (2013.01); *H04W 4/043* (2013.01); *H04W 12/06* (2013.01)

(58) Field of Classification Search
None
See application file for complete search history.

(56) References Cited

U.S. PATENT DOCUMENTS

| | | |
|---|---|---|
| 8,909,244 B2 | 12/2014 | Curticapean |
| 2005/0251401 A1 | 11/2005 | Shuey |
| 2008/0254833 A1 | 10/2008 | Keevill et al. |
| 2008/0258973 A1 | 10/2008 | Heidari-Bateni et al. |
| 2010/0150117 A1 | 6/2010 | Aweya et al. |

(Continued)

FOREIGN PATENT DOCUMENTS

WO   2010129589   11/2010

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Diane Mizrahi
(74) *Attorney, Agent, or Firm* — Shichrur & Co.

(57) ABSTRACT

Some demonstrative embodiments include apparatuses, systems and/or methods of Fine Timing Measurement (FTM). For example, an apparatus may include circuitry and logic configured to cause an initiator station to transmit an FTM request message to a responder station, the FTM request message comprising a challenge token; process an FTM measurement frame received from the responder station, the FTM measurement frame comprising a security token, which is based on the challenge token; and authenticate the responder station based on the security token.

25 Claims, 9 Drawing Sheets

(56) References Cited

U.S. PATENT DOCUMENTS

| | | |
|---|---|---|
| 2010/0199296 A1 | 8/2010 | Lee et al. |
| 2011/0320539 A1 | 12/2011 | Zhao et al. |
| 2012/0182180 A1 | 7/2012 | Wolf et al. |
| 2012/0210130 A1 | 8/2012 | Buer et al. |
| 2012/0221853 A1 | 8/2012 | Wingert et al. |
| 2013/0307723 A1 | 11/2013 | Garin et al. |
| 2013/0336287 A1 | 12/2013 | Abraham et al. |
| 2014/0073352 A1* | 3/2014 | Aldana ............... G01S 5/10 455/456.1 |
| 2014/0187259 A1 | 7/2014 | Kakani et al. |
| 2015/0222602 A1 | 8/2015 | Steiner et al. |
| 2016/0044524 A1 | 2/2016 | Ben-Haim et al. |
| 2016/0157193 A1* | 6/2016 | Qi ..................... H04W 56/00 370/350 |
| 2016/0198317 A1* | 7/2016 | Li ..................... H04W 4/08 370/312 |
| 2016/0242056 A1* | 8/2016 | Patil ................... H04W 24/08 |

OTHER PUBLICATIONS

U.S. Appl. No. 15/086,108, filed Mar. 31, 2016, 69 pages.
Office Action for U.S. Appl. No. 14/127,401, mailed on Aug. 13, 2015, 20 pages.
Office Action for U.S. Appl. No. 14/127,401, mailed on Mar. 9, 2016, 14 pages.
International Search Report and Written Opinion for PCT/US2013/061539, mailed on Jun. 16, 2014, 12 pages.
Office Action for U.S. Appl. No. 14/127,401, mailed on Oct. 6, 2016, 15 pages.
Advisory Action for U.S. Appl. No. 14/127,401, mailed on Jun. 16, 2016, 9 pages.
Notice of Allowance for U.S. Appl. No. 14/127,401, dated Apr. 11 2017, 28 pages.
Office Action for Korean Patent Application No. KR 2016-7004880, dated Dec. 16, 2016, 10 pages (5 pages English translation).
Supplementary European Search Report for European Application No. 13894595.1, dated May 11, 2017, 8 pages.

* cited by examiner

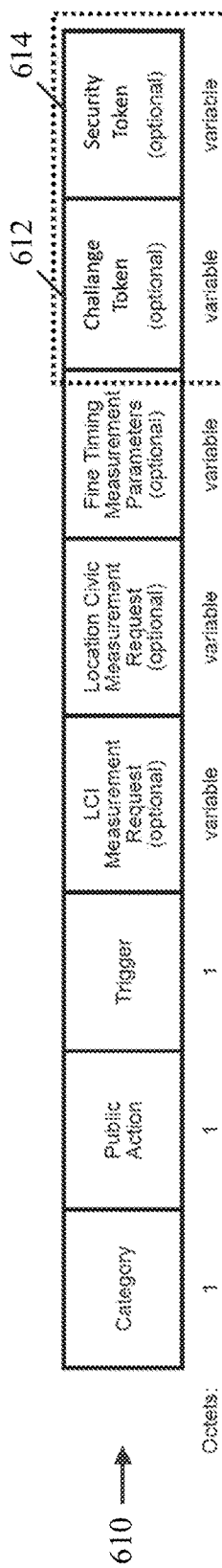
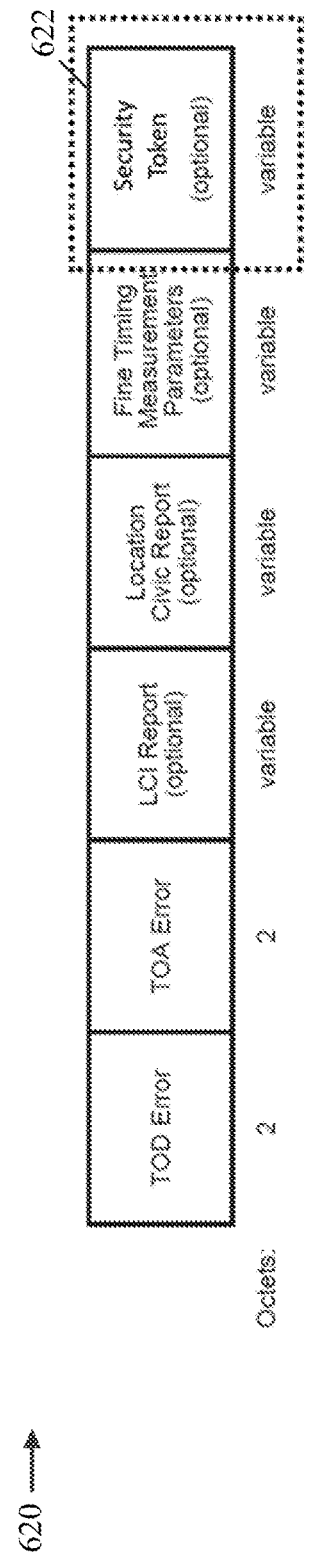
Fig. 6A
Fig. 6B

APPARATUS, SYSTEM AND METHOD OF FINE TIMING MEASUREMENT (FTM)

CROSS REFERENCE

This Application claims the benefit of and priority from U.S. Provisional Patent Application No. 62/210,963 entitled "TECHNIQUES FOR SECURE LOCATION MEASUREMENT", filed Aug. 27, 2015, the entire disclosure of which is incorporated herein by reference.

TECHNICAL FIELD

Embodiments described herein generally relate to Fine Timing Measurement (FTM).

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) may include measuring a Round Trip Time (RTT) from a wireless station (STA) to a plurality of other STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6A is a schematic illustration of a structure of an FTM request message, and FIG. 6B is a structure of an FTM measurement frame, in accordance with some demonstrative embodiments.

DETAILED DESCRIPTION

Figure 1:
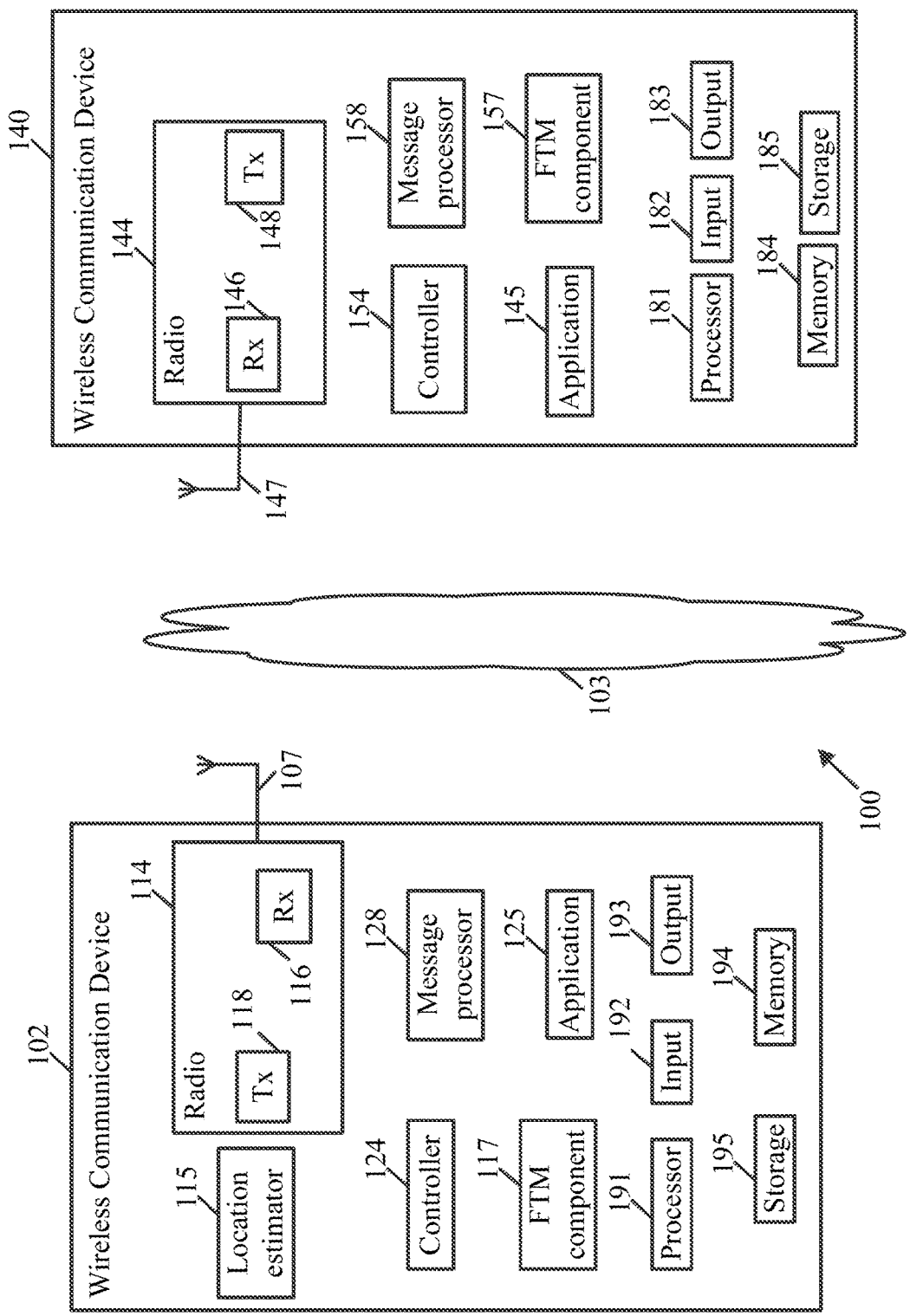
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a sensor device, a wearable device, an Internet of Things (IoT) device, a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommuni-* cations and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning)) and/or future versions and/or derivatives thereof, devices and/or networks operating in accordance with existing WiFi Alliance (WFA) Specifications (including *Wi-Fi Neighbor Awareness Networking (NAN) Technical Specification, Version 1.0, May 1, 2015*) and/or future versions and/or derivatives thereof, devices and/or networks operating in accordance with existing WFA Peer-to-Peer (P2P) specifications (including *WiFi P2P technical specification, version 1.5, Aug. 4, 2014*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, one of wireless communication devices 102 and/or 140, e.g., device 102, may perform the functionality of a non-AP STA, and/or one of wireless communication devices 102 and/or 140, e.g., device 140, may perform the functionality of an AP STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to estimate a location of device 102, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, the ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, devices 102 and/or 140 may be configured to perform one or more operations and/or communications, for example, according to a Fine Time Measurement (FTM) procedure and/or protocol, e.g., as described below.

In some demonstrative embodiments, device 102 and/or device 140 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102 and/or 140 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, device 102 and/or device 140 may be configured to utilize an FTM Protocol, for example, in accordance with the *IEEE* 802.11*REVmc D4.0 Specification*, and/or any other specification, standard and/or protocol. For example, device 102, and/or device 140 may be configured to use the FTM protocol to measure the RTT between devices 102 and 140.

In some demonstrative embodiments, device 102 may include an FTM component 117, and/or device 140 may include an FTM component 157, which may be configured to perform one or more FTM measurements, operations and/or communications, e.g., as described below.

In some demonstrative embodiments, FTM components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of FTM components 117 and/or 157. Additionally or alternatively, one or more functionalities of FTM components 117 and/or 157 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages, e.g., as described below.

In some demonstrative embodiments, FTM component 157 may be configured to perform one or more operations of, and/or at least part of the functionality of, message processor 158 and/or controller 154, for example, to trigger communication of one or more FTM messages, e.g., as described below.

In some demonstrative embodiments, FTM components 117 and/or 157 may be configured to trigger the FTM measurements, for example, periodically and/or or upon a request from an application executed by a device, for example, to determine an accurate location of the device.

In some demonstrative embodiments, FTM components 117 and/or 157 may be configured to perform one or more measurements according to an FTM protocol, for example, in accordance with an *IEEE* 802.11 *Specification*, e.g., an *IEEE* 802.11*RevMC Specification* and/or any other specification and/or protocol.

In some demonstrative embodiments, FTM components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, device 102 may be configured to perform one or more FTM measurements, for example between device 102 and device 140, for example, to determine a location of device 102, e.g., as described below.

In some demonstrative embodiments, FTM component 117 may be configured to perform one or more operations of an FTM initiator station to initiate one or more FTM measurements with one or responder stations, e.g., device 140 and/or any other responder station.

In some demonstrative embodiments, FTM component 157 may be configured to perform one or more operations of an FTM responder station to perform one or more FTM measurements with one or more mobile devices, e.g., device 102.

In some demonstrative embodiments, device 102, may be configured to perform one or more operations of an FTM initiator station to initiate an FTM procedure with a station operating as an FTM responder, for example, device 140, e.g., as described below with reference to FIG. 2.

In some demonstrative embodiments, device 140 may be configured to perform one or more operations of an FTM responder station to perform FTM measurements with a station operating as an FTM initiator station, for example, a mobile device, e.g., device 102, e.g., as described below with reference to FIG. 2.

Figure 2:
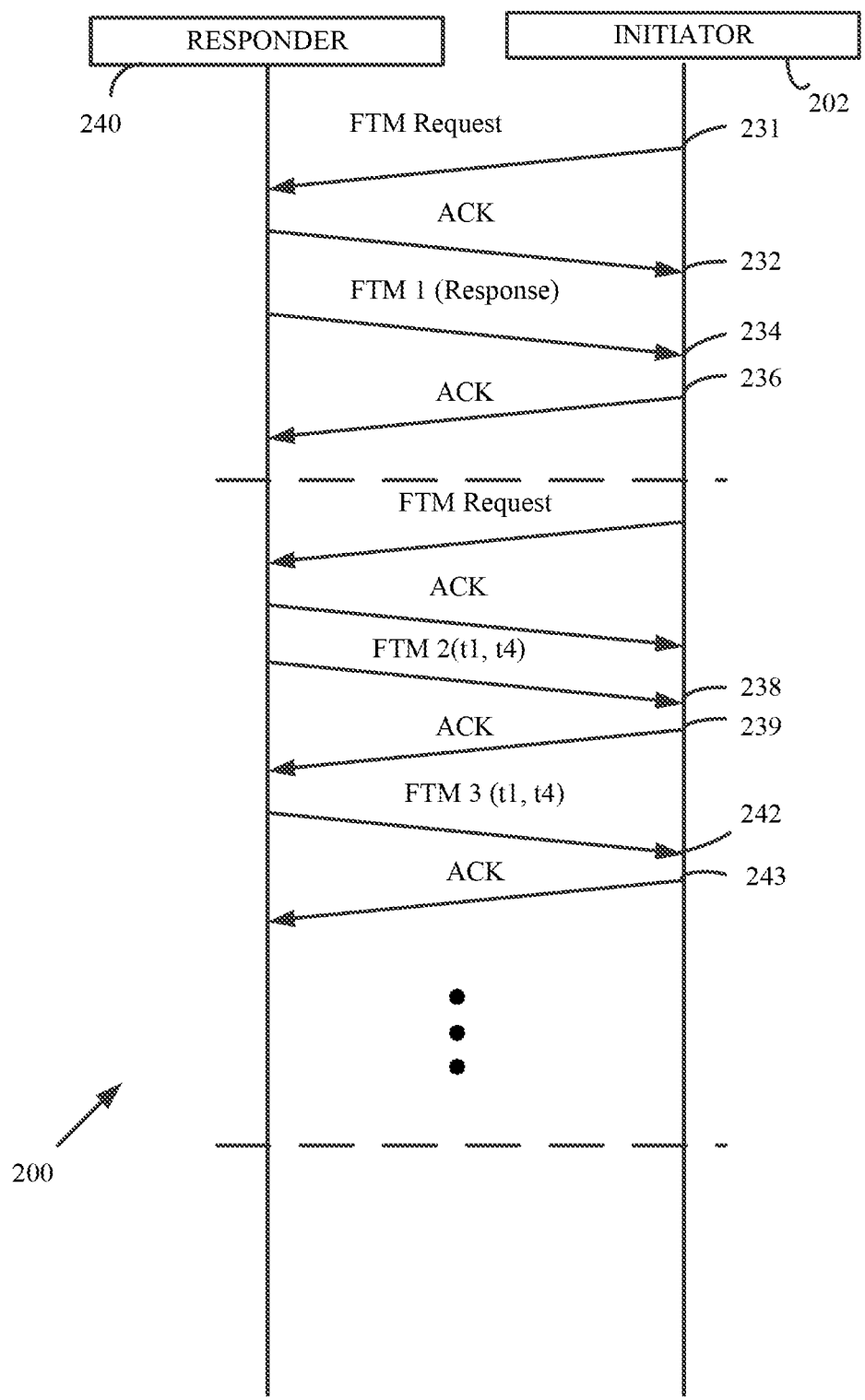
FIG. 2 is a schematic illustration of a sequence diagram of operations between an initiator and a responder of a Fine Time Measurement (FTM) procedure, in accordance with some demonstrative embodiments.

Reference is made to FIG. 2, which schematically illustrates a sequence diagram, which demonstrates operations and interactions between a first wireless communication device 202 ("Initiating STA", "FTM initiator", or "initiator") and a second wireless communication device 240 ("Responding STA", "FTM responder", or "responder"), of an FTM procedure 200, in accordance with some demonstrative embodiments. In one example, device 202 may perform the functionality of device 102 (FIG. 1), and/or device 240 may perform the functionality of device 140 (FIG. 1).

As shown in FIG. 2, device 202 may transmit to device 240 an FTM request message 231 to request to perform the FTM procedure 200 with device 240. For example, FTM component 117 (FIG. 1) may trigger, instruct, cause and/or request radio 114 (FIG. 1) to transmit the FTM request message 231, e.g., to device 140 (FIG. 1).

As shown in FIG. 2, device 240 may transmit an FTM request acknowledgement (ACK) 232 to device 202, to acknowledge receipt of the FTM request message 231, and to confirm the request to perform the FTM procedure. For example, FTM component 157 (FIG. 1) may trigger, instruct, cause and/or request radio 144 (FIG. 1) to process transmission of the FTM request ACK message 232 to device 102 (FIG. 1).

As shown in FIG. 2, FTM procedure 200 may include an FTM measurement period, during which devices 202 and 240 may communicate FTM measurement frames, e.g., as described below. For example, FTM component 117 (FIG. 1) may trigger, instruct, cause and/or request radio 114 (FIG. 1) to communicate one or more FTM measurement messages with device 140 (FIG. 1) during the FTM measurement period; and/or FTM component 157 (FIG. 1) may trigger, instruct, cause and/or request radio 144 (FIG. 1) to communicate the one or more FTM measurement messages with device 102 (FIG. 1) during the FTM measurement period, e.g., as described below.

In some demonstrative embodiments, devices 202 and/or 240 may communicate the FTM measurement frames between devices 202 and 240 during the FTM measurement period, for example, to determine a Time of Flight (ToF) value between devices 202 and 240.

In some demonstrative embodiments, as shown in FIG. 2, device 240 may transmit an FTM message 234 to device 202, at a time, denoted t1. The time t1 may be a Time of Departure (ToD), denoted ToD(M), of message 234.

In some demonstrative embodiments, as shown in FIG. 2, device 202 may receive message 234 and may determine a time, denoted t2, e.g., by determining a Time of Arrival (ToA), denoted ToA(M), of message 234. For example, FTM component 117 (FIG. 1) may be configured to trigger, instruct, cause and/or request radio 114 (FIG. 1) to process receipt of message 234, and/or FTM component 117 (FIG. 1) may be configured to determine the ToA of message 234.

In some demonstrative embodiments, as shown in FIG. 2, device 202 may transmit a message 236 to device 240, at a time, denoted t3. Message 236 may include, for example, an acknowledgement message transmitted in response to FTM message 234. The time t3 may be a ToD, denoted ToD (ACK), of the message 236. For example, FTM component 117 (FIG. 1) may be configured to trigger, instruct, cause and/or request radio 114 (FIG. 1) to transmit message 236, and/or FTM component 117 (FIG. 1) may be configured to determine the ToD of message 236.

In some demonstrative embodiments, as shown in FIG. 2, device 240 may receive message 236 and may determine a time, denoted t4, e.g., by determining a ToA, denoted ToA(ACK), of message 236. For example, FTM component 157 (FIG. 1) may be configured to trigger, instruct, cause and/or request radio 144 (FIG. 1) to receive message 236, and/or FTM component 157 (FIG. 1) may be configured to determine the ToA of message 236.

In some demonstrative embodiments, as shown in FIG. 2, device 240 may transmit an FTM message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4. For example, FTM component 157 (FIG. 1) may be configured to trigger, instruct, cause and/or request radio 144 (FIG. 1) to transmit message 238.

In some demonstrative embodiments, as shown in FIG. 2, device 202 may receive message 238. For example, FTM component 117 (FIG. 1) may be configured to trigger, instruct, cause and/or request radio 114 (FIG. 1) to process receipt of message 238, and/or FTM component 117 (FIG. 1) may be configured to access, extract and/or process the information corresponding to the time t1 and/or the time t4.

In some demonstrative embodiments, as shown in FIG. 2, device 202 may transmit a message 239 to device 240. Message 239 may include, for example, an acknowledgement message transmitted in response to message 238. For example, FTM component 117 (FIG. 1) may be configured to trigger, instruct, cause and/or request radio 114 (FIG. 1) to transmit message 239.

In some demonstrative embodiments, as shown in FIG. 2, device 240 may transmit an FTM message 242 to device 202. Message 242 may include, for example, information corresponding to the time t1 and/or the time t4 with respect to the messages 238 and/or 239. For example, message 242 may include a timestamp, e.g., a ToD timestamp, including the time t1 corresponding to the message 238, and a timestamp, e.g., a ToA timestamp, including the time t4 corresponding to the message 239. For example, FTM component 157 (FIG. 1) may be configured to trigger, instruct, cause and/or request radio 144 (FIG. 1) to generate and/or transmit message 242.

In some demonstrative embodiments, as shown in FIG. 2, device 202 may receive message 242. For example, FTM component 117 (FIG. 1) may be configured to trigger, instruct, cause and/or request radio 114 (FIG. 1) to process receipt of message 242, and/or FTM component 117 (FIG. 1) may be configured to access, extract and/or process the information corresponding to the time t1 and/or the time t4.

In some demonstrative embodiments, as shown in FIG. 2, device 202 may transmit a message 243 to device 240. Message 243 may include, for example, an acknowledgement message transmitted in response to message 242. For example, FTM component 117 (FIG. 1) may be configured to trigger, instruct, cause and/or request radio 114 (FIG. 1) to transmit message 243.

In some demonstrative embodiments, device 202 may determine a ToF between device 202 and device 240, for example, based on message 238 and/or message 242. For example, FTM component 117 (FIG. 1) may be configured determine the ToF, e.g., as described below.

For example, device 202 may determine the ToF based on an average, or any other function, applied to the time values t1, t2, t3 and t4. For example, device 202 may determine the ToF, e.g., as follows:

$$ToF=[(t4-t1)-(t3-t2)]/2 \quad (1)$$

In some demonstrative embodiments, device 202 may determine the distance between devices 202 and 240 based on the calculated ToF.

For example, device 202 may determine the distance, denoted $r_k$, e.g., as follows:

$$r_k=ToF*C \quad (2)$$

wherein C denotes the radio wave propagation speed.

Referring back to FIG. 1, in some demonstrative embodiments, in some cases an FTM procedure, e.g., FTM procedure 200 (FIG. 2), may be used by an enterprise, for example, for asset tracking, document rights accessibility, and/or the like.

In some demonstrative embodiments, these usages may require a protection, for example, against a possibility of an adversary, e.g., to trick a mobile device into deriving a false location of the device.

In one example, an adversary may perform an "AP spoofing attack" for example, by placing a counterfeit device, which may impersonate to an enterprise-deployed FTM Responder, e.g., by using a Basic Service Set Identifier (BSSID) or a Media Access Control (MAC) address of the enterprise-deployed FTM Responder. According to this example, a false location may be calculated by the mobile device, which may result in bypassing location-based services and/or protection of the enterprise.

In some demonstrative embodiments, devices 102 and/or 140 may be configured to perform operations and/or communications of an FTM protocol, which may be configured to provide one or more benefits, and/or advantages and/or to solve one or more the problems and/or shortcomings of the FTM procedure 200 (FIG. 2), e.g., as described below.

Some demonstrative embodiments may be configured to enhance one or standards and/or protocols, e.g., an *IEEE 802.11 Specification*, to enable, for example, protection against adversary devices pretending to be enterprise-approved APs, responders, or FTM Responders.

In some demonstrative embodiments, it may not be efficient to use vendor specific additions to a FTM Responder protocol, for example, to enable an authentication.

In some demonstrative embodiments, it may not be efficient to use Protected Management Frames (PMF) for authenticating an FTM Responder.

In some demonstrative embodiments, it may not be efficient to use higher layer protocols to attest an authenticity of an FTM Responder.

In some demonstrative embodiments, it may not be efficient to use network-based positioning techniques, for example, which may shift the burden from authenticating a responder station to authenticating an initiating station.

In some demonstrative embodiments, devices 102 and/or 140 may be configured to perform operations and/or communications of an FTM protocol, which may be configured to provide one or more benefits, and/or advantages and/or to solve one or more the problems and/or shortcomings of the one or more of the inefficient solutions described above.

Some demonstrative embodiments may provide a solution, which may be standardized, and/or which may enable inter-device operability.

Some demonstrative embodiments may provide a solution, which may not require lengthy authentication mechanisms, for example, which may be used for PMF.

Some demonstrative embodiments may provide a solution, which may not require higher-level transactions.

Some demonstrative embodiments may provide a solution, which may be contained, for example, in a small size device, e.g., FTM Responders having reduced computation power.

Some demonstrative embodiments may provide a solution, which may incur less time, and/or less latency, and, therefore may conserve a power consumption of a device and/or may allow increased responsiveness of the device.

In some demonstrative embodiments, one or more elements may be added to an FTM procedure, e.g., FTM procedure 200 (FIG. 2), which may enable a device, e.g., a responder or an initiator, to prove an authenticity of the device.

In some demonstrative embodiments, a first device, e.g., one of an initiator and a responder, may prove its identity to a second device, e.g., another one of the initiator and the responder, for example, by providing a proof to the second device that the first device knows a secret.

In one example, the secret may be known by both the first device and the second device.

In another example, the secret may be a part of a public/private key pair, which means the second device does not know the secret, but the second device can validate the secret.

Some demonstrative embodiments may enable an initiator to validate an authenticity of a responder, e.g., as described below.

In some demonstrative embodiments, an initiator, e.g., device 102, and a responder, e.g., device 140, may utilize a challenge-response mechanism to authenticate an identity of the responder, e.g., as described below.

In some demonstrative embodiments, providing a proof that the responder knows a secret, for example, by transmitting the secret to the initiator, may not be effective.

In one example, an eavesdropper or an adversary may copy the secret, and may be able to use the copied secret for impersonation.

In some demonstrative embodiments, an initiator may send an arbitrary token to a responder, which the initiator requests to authenticate.

In some demonstrative embodiments, the responder may prove possession of a secret, for example, by using the secret and the arbitrary token as inputs to a cryptographic (crypto) algorithm, and may send the result of the crypto algorithm to the initiator.

In some demonstrative embodiments, the initiator may verify that the responder possesses the correct secret, for example, based on the received result, e.g., the initiator may have knowledge of the arbitrary token and the crypto algorithm, and may be able to verify the received result.

In some demonstrative embodiments, devices 102 and 140 may be configured to utilize the challenge-response mechanism during, and/or as part of, an FTM procedure, e.g., FTM procedure 200 (FIG. 2).

In some demonstrative embodiments, devices 102 and 140 may be configured to use one or more FTM measurement frames, to perform the challenge-response mechanism, e.g., as described below.

In some demonstrative embodiments, devices 102 and 140 may use the challenge-response mechanism to authenticate an identity of a responder, for example, device 140, e.g., as described below.

In some demonstrative embodiments, FTM component 117 may be configured to control, cause and/or trigger device 102 to transmit an FTM request, e.g., FTM request 231 (FIG. 2), to device 140.

In one example, message processor 128 may generate the FTM request, and/or transmitter 118 may transmit the FTM request to device 140.

In some demonstrative embodiments, the FTM request may include a challenge token, e.g., as described below.

In one example, message processor 128 and/or FTM component 117 may be configured to generate the challenge token, e.g., as described below.

In some demonstrative embodiments, the challenge token may include an arbitrary value.

In some demonstrative embodiments, the FTM request message may include a challenge token field including the challenge token, e.g., as described below.

In some demonstrative embodiments, device 140 may receive the FTM request from device 102.

In some demonstrative embodiments, FTM component 157 may be configured to control, cause and/or trigger device 140 to process the FTM request from device 102.

In one example, receiver 146 may receive the FTM request from device 102, and/or message processor 128 may be configured to access, process, and/or decode the FTM request.

In some demonstrative embodiments, FTM component 157 may be configured to control, cause and/or trigger device 140 to determine a security token, for example, based on the challenge token.

In some demonstrative embodiments, FTM component 157 may be configured to control, cause and/or trigger device 140 to determine the security token, for example, based on one or more parameters, for example, in addition to the challenge token, e.g., as described below.

In one example, FTM component 157 may be configured to determine the security token, for example, by using the challenge token and the one or more parameters as an input to a cryptographic function.

In some demonstrative embodiments, FTM component 157 may be configured to control, cause and/or trigger device 140 to determine the security token, for example, based on shared key information shared between device 102 and device 140.

In some demonstrative embodiments, the shared key information may be issued by a certified entity to both devices 102 and 140.

In some demonstrative embodiments, the shared key information may include and/or represent a shared key, which may be shared between devices 102 and 140.

In some demonstrative embodiments, the shared key information may include a key pair including a private key and public key. For example, the security token may be determined based on the private key, for example, which may be held by device 140, and the security key may be verified and/or authenticated using the public key, for example, which may be held by device 102, as described below.

In some demonstrative embodiments, FTM component 157 may be configured to control, cause and/or trigger device 140 to receive the shared key information from a certified entity, e.g., a vendor of device 140.

In some demonstrative embodiments, FTM component 157 may be configured to control, cause and/or trigger device 140 to determine the security token, for example, based on a time value.

In some demonstrative embodiments, the time value may be based on a Time Synchronization Function (TSF), e.g., a TSF of device 140.

In some demonstrative embodiments, FTM component 157 may be configured to control, cause and/or trigger device 140 to determine the security token, for example, based on an identifier of device 140, e.g., an address of device 140.

For example, device 140 may determine the security token, for example, based on a MAC address of device 140.

In some demonstrative embodiments, FTM component 157 may be configured to control, cause and/or trigger device 140 to determine the security token, for example, based on an identifier of device 102, e.g., an address of device 102.

For example, device 140 may determine the security token, for example, based on a MAC address of device 102. In one example, device 140 may determine the security token, for example, based on a randomized MAC address of device 102, for example, if device 102 employs a MAC address randomization mechanism.

In one example, FTM component 157 may be configured to determine the security token, for example, by using the challenge token, the shared key information, and/or one or more of the one or more parameters as an input to a cryptographic function.

In some demonstrative embodiments, FTM component 157 may be configured to control, cause and/or trigger device 140 to transmit an FTM measurement frame, e.g., FTM frame 234 (FIG. 2), to device 102, for example, in response to the FTM request.

In one example, message processor 158 may generate The FTM measurement frame, and/or transmitter 148 may transmit the FTM measurement frame to device 102.

In some demonstrative embodiments, the FTM measurement frame may include the security token, which may be based on the challenge token and the one or more parameters, e.g., as described above.

In some demonstrative embodiments, the FTM measurement frame may include a security field including the security token, e.g., as described below.

In some demonstrative embodiments, device 102 may receive from device 140 the FTM measurement frame including the security token, which is based, for example, on the challenge token and one or more of the one or more parameters.

In some demonstrative embodiments, FTM component 117 may be configured to control, cause and/or trigger device 102 to process the FTM measurement frame from device 140.

In one example, receiver 116 may receive the FTM measurement frame from device 140, and/or message processor 128 may be configured to access, process, and/or decode the FTM measurement frame.

In some demonstrative embodiments, FTM component 117 may be configured to control, cause and/or trigger device 102 to authenticate device 140, for example, based on the security token.

In one example, FTM component 117 may be configured, for example, to use the shared key information, which is shared between devices 102 and 140, and the challenge token, which is provided to device 140, as an input to the cryptographic function, and to compare a result of the cryptographic function to the security token.

In some demonstrative embodiments, FTM component 117 may be configured to control, cause and/or trigger device 102 to select to discontinue an FTM measurement procedure with device 140, for example, if device 140 is not successfully authenticated, e.g., if the result of the cryptographic function does not match the security token.

In some demonstrative embodiments, FTM component 117 may be configured to control, cause and/or trigger device 102 to use FTM information from device 140, for example, only if device 140 is successfully authenticated, e.g., if the result of the cryptographic function matches the security token.

In some demonstrative embodiments, FTM component 117 may be configured to control, cause and/or trigger device 102 to determine a range between device 102 and device 140, based on the FTM measurement frame, e.g., if device 140 is successfully authenticated.

In some demonstrative embodiments, FTM component 117 may be configured to control, cause and/or trigger device 102 to perform one or more additional or alternative operations based on whether or not device 140 is successfully authenticated.

In some demonstrative embodiments, the challenge token may include an encrypted challenge value.

In some demonstrative embodiments, FTM component 117 may be configured to control, cause and/or trigger device 102 to generate the challenge token by encrypting a challenge value to generate an encrypted challenge token.

In some demonstrative embodiments, device 140 may receive the FTM request message including the encrypted challenge token.

In some demonstrative embodiments, FTM component 157 may be configured to control, cause and/or trigger device 140 to determine the challenge value by decrypting the encrypted challenge token.

In some demonstrative embodiments, FTM component 157 may be configured to control, cause and/or trigger device 140 to transmit the FTM measurement frame including the challenge value.

In some demonstrative embodiments, device 102 may receive the FTM measurement frame including the challenge value, e.g., as the security token.

In some demonstrative embodiments, FTM component 117 may be configured to control, cause and/or trigger device 102 to determine device 140 is successfully authenticated, for example, if the security token includes the challenge value.

In one example, authentication of device 140 based on the challenge value may enable device 102 to authenticate device 140, for example, if a complexity, e.g., computation complexity, of encryption and/or decryption of device 102 is lower than computation complexity of device 140. According to this example, device 102 may be configured to prepare and/or receive an encrypted challenge token in advance, and device 140 may be configured to perform the encryption computations.

Figure 3:
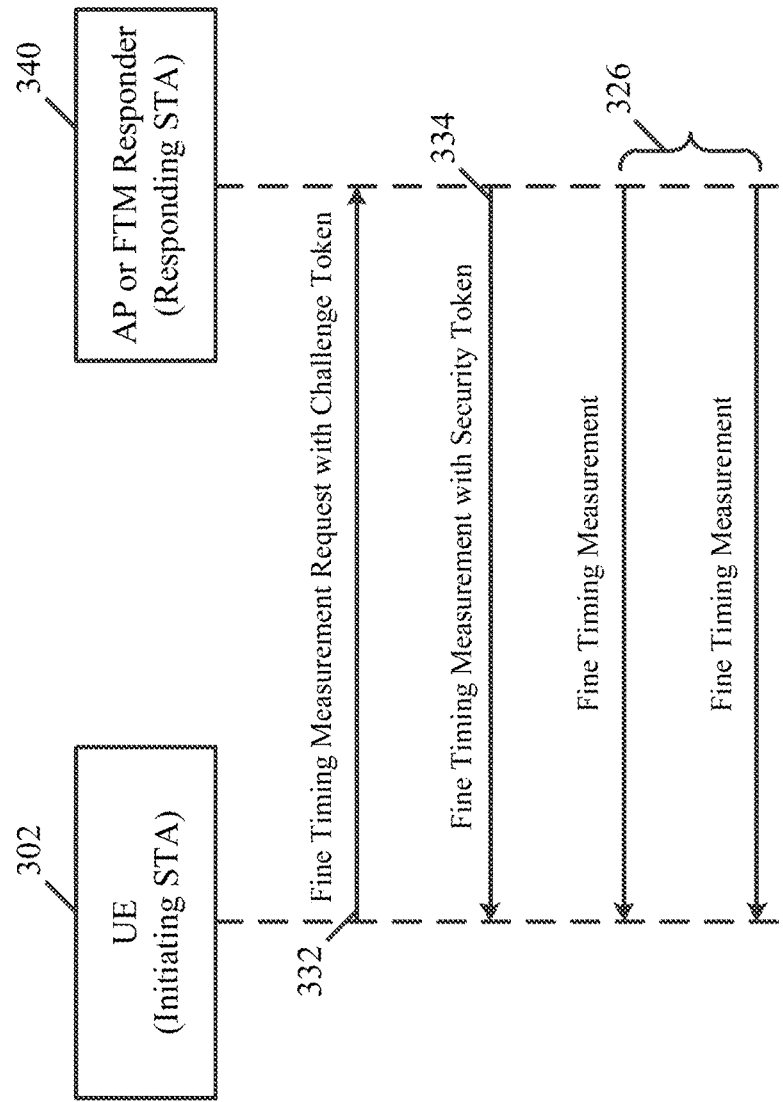
FIG. 3 is a schematic illustration of an FTM procedure, in accordance with some demonstrative embodiments.

Reference is made to FIG. 3, which schematically illustrates an FTM procedure 300, in accordance with some demonstrative embodiments. For example, FTM procedure 300 may enable an initiator 302 to authenticate a responder 340. For example, initiator 302 may perform the functionality of device 102 (FIG. 1); and/or responder 340 may perform the functionality of device 140 (FIG. 1).

In some demonstrative embodiments, as shown in FIG. 3, the initiator 302 may transmit an FTM request message 332 to the responder device 340. For example, device 102 (FIG. 1) may transmit FTM request 332 to device 140 (FIG. 1).

In some demonstrative embodiments, as shown in FIG. 3, FTM request 332 may include a challenge token, e.g., an arbitrary (pseudo-random) Challenge Token, or any other, e.g., non-random, challenge token.

In some demonstrative embodiments, as shown in FIG. 3, the responder device 340 may receive from the initiator 302 the FTM request 332 including the challenge token.

In some demonstrative embodiments, as shown in FIG. 3, the responder device 340 may transmit an FTM measurement frame 334 to the initiator 302. For example, device 140 (FIG. 1) may transmit FTM measurement frame 334 to device 102 (FIG. 1).

In some demonstrative embodiments, as shown in FIG. 3, FTM measurement frame 334 may include a security token.

In some demonstrative embodiments, responder 340 may generate the security token, to cryptographically encompass one or more parameters, e.g., some or all, of the parameters described below.

In some demonstrative embodiments, the parameters may include the Challenge Token, e.g., provided by the initiator 302.

In some demonstrative embodiments, the parameters may include an indication of an address of initiator 302, e.g., the MAC Address of initiator 302 or any other address and/or identifier of initiator 302. In one example, both initiator 302 and responder 340 may employ "MAC Address randomization", however, the MAC Addresses used for the FTM Request message 334 may be used.

In some demonstrative embodiments, the parameters may include an indication of an address of responder 340, e.g., MAC Address of Responder 340 or any other address and/or identifier of responder 340.

In some demonstrative embodiments, the parameters may include an Agreed secret, e.g., a public/private key pair, a shared key, and/or any other key information, generated by an enterprise owning responder 340, or any other entity.

In some demonstrative embodiments, the parameters may include time related information, for example, a TSF value or any other time value, e.g., to prevent replay attacks.

In some demonstrative embodiments, responder 340 may attach the security token to one or more FTM messages 326.

In some demonstrative embodiments, it may be guaranteed that FTM messages 326 are generated by the same device, for example, since a same type of message of FTM messages 326 is used physically to perform the FTM measurements and for carrying the authentication data.

In some demonstrative embodiments, if the initiator 302 detects that the responder 340 is non-genuine, the initiator 302 may stop an FTM procedure with responder 340; may disregard data provided by responder 340; may restrain from retrying responder 340; may alert other network occupants, e.g., a security server of system 100; and/or may perform any other additional or alternative operation.

In other embodiments, initiator 302 may be configured to encrypt a challenge value to determine the Challenge Token, e.g., the encrypted challenge token, for example, by using the one or more parameters described above.

In some demonstrative embodiments, responder 340 may prove its authenticity to initiator 320, for example, by successfully decoding, e.g., decrypting, the Challenge Token, and providing the decrypted token, e.g., the challenge value, back to the initiator 302, e.g., encrypted or clear.

In some demonstrative embodiments, decoding the challenge token by responder 340 may be useful, for example, if a cost, e.g., computation complexity, of encrypt/decrypt is not symmetrical between the initiator 302 and responder 340.

In one example, decoding the challenge token be responder 340, may enable the initiator 302, for example, to prepare the encrypted challenge token in advance, e.g., even not in real time, for example, even without performing any computations during FTM procedure 300.

Referring back to FIG. 1. in some demonstrative embodiments, devices 102 and 140 may be configured to perform operations and/or communications of an FTM procedure, which may enable a responder to authenticate an initiator of the FTM procedure, for example, FTM procedure 200 (FIG. 2), e.g., as described below.

In some demonstrative embodiments, devices 102 and 140 may be configured to use one or more FTM frames, to enable the responder to authenticate the initiator, e.g., as described below.

In one example, an owner of a responder may choose not to provide FTM services to unknown or anonymous devices.

In another example, an owner of a responder may wish not to allow mobile devices, which are not pre-authenticated, to receive network-based positioning.

In some demonstrative embodiments, FTM component 117 may be configured to control, cause and/or trigger device 102 to generate an initiator security token.

In some demonstrative embodiments, FTM component 117 may be configured to control, cause and/or trigger device 102 to determine the initiator security token, for example, based on shared key information, which may be shared between device 102 and device 140, and/or any other key information, which may be shared between devices 102 and 140.

In some demonstrative embodiments, the shared key information may be issued by the certified entity to both devices 102 and 140.

In some demonstrative embodiments, FTM component 117 may be configured to control, cause and/or trigger device 102 to receive the key information, e.g., the shared key information, from the certified entity.

In some demonstrative embodiments, FTM component 117 may be configured to control, cause and/or trigger device 102 to determine the initiator security token, for example, based on the key information, e.g., the shared key, and one or more other parameters, e.g., as described below.

In some demonstrative embodiments, FTM component 117 may be configured to control, cause and/or trigger device 102 to determine the initiator security token, for example, based on a time value.

In some demonstrative embodiments, the time value may be based on a Time Synchronization Function (TSF), e.g., a TSF of device 102. In other embodiments, the time value may be based on any other function or method.

In some demonstrative embodiments, FTM component 117 may be configured to control, cause and/or trigger device 102 to determine the initiator security token, for example, based on an identifier of device 102, e.g., based on the address of device 102.

For example, device 102 may determine the initiator security token, for example, based on the MAC address of device 102.

In some demonstrative embodiments, FTM component 117 may be configured to control, cause and/or trigger device 102 to determine the initiator security token, for example, based on an identifier of device 140, e.g., based on the address of device 140.

In one example, device 102 may determine the initiator security token, for example, based on a randomized MAC address of device 140, for example, if device 140 employs a MAC address randomization mechanism.

In one example, FTM component 117 may be configured to determine the initiator security token, for example, by using the shared key information, the time value, and one or more of the one or more parameters as an input to a cryptographic function.

In some demonstrative embodiments, FTM component 117 may be configured to control, cause and/or trigger device 102 to transmit to device 140 an FTM request including the initiator security token.

In one example, message processor 128 may generate the FTM request, and/or transmitter 118 may transmit The FTM request to device 140.

In some demonstrative embodiments, device 140 may receive from device 102 the FTM request including the initiator security token.

In some demonstrative embodiments, FTM component 157 may be configured to control, cause and/or trigger device 140 to process the FTM request including the initiator security token from device 102.

In one example, receiver 146 may receive the FTM request from device 102, and/or message processor 158 may be configured to access, process, and/or decode the FTM request including the initiator security token.

In some demonstrative embodiments, FTM component 157 may be configured to control, cause and/or trigger device 140 to authenticate device 102, for example, based on the initiator security token.

In one example, FTM component 157 may be configured, for example, to use the shared key or any other key information, which may be shared between devices 102 and 140, and the initiator security token, as an input to the cryptographic function, and to compare a result of the cryptographic function to the initiator security token.

In some demonstrative embodiments, FTM component 157 may be configured to control, cause and/or trigger device 140 to transmit an FTM measurement frame to device 102, e.g., in response to the FTM request frame including the initiator security token, for example, only if device 102 is successfully authenticated, e.g., if a result of the cryptographic function matches the initiator security token.

In some demonstrative embodiments, FTM component 157 may be configured to control, cause and/or trigger device 140 to reject the FTM request from device 102, for example, if device 102 is unauthenticated, e.g., if a result of the cryptographic function does not match the initiator security token.

In some demonstrative embodiments, devices 102 and 140 may be configured to authenticate each other, e.g., during the same FTM procedure.

In some demonstrative embodiments, device 102 may be configured to authenticate device 140, for example, after device 140 authenticates device 102, e.g., based on the initiator security token.

In some demonstrative embodiments, device 102 may be configured to authenticate device 140, for example, based on a responder security token, which may be included in the FTM measurement frame, which may be transmitted from device 140 to device 102, e.g., only of if device 102 is successfully authenticated by device 140.

In some demonstrative embodiments, FTM component 157 may be configured to control, cause and/or trigger device 140 to transmit the FTM measurement frame to device 102, e.g., if device 102 is successfully authenticated by device 140.

In some demonstrative embodiments, the FTM measurement frame may include the responder security token.

In some demonstrative embodiments, the responder security token and the initiator security token may be based on the shared key information, e.g., the shared key, which is shared between devices 102 and 140.

In some demonstrative embodiments, the responder security token may be based on the address of device 102 and/or on the address of device 140.

In some demonstrative embodiments, devices 102 and 140 may implement the challenge response mechanism, for example, when devices 102 and 140 authenticate each other.

In some demonstrative embodiments, the initiator security token may be configured as and/or used as a challenge token.

In some demonstrative embodiments, device 140 may determine the responder security token based on the initiator security token.

In some demonstrative embodiments, device 102 may receive the FTM measurement frame including the responder security token.

In some demonstrative embodiments, device 102 may authenticate device 140, for example, based on the responder security token.

In some demonstrative embodiments, FTM component 117 may determine a range between devices 102 and 140, for example, based on the FTM measurement frame including the responder security token, e.g., if device 140 is successfully authenticated.

Figure 4:
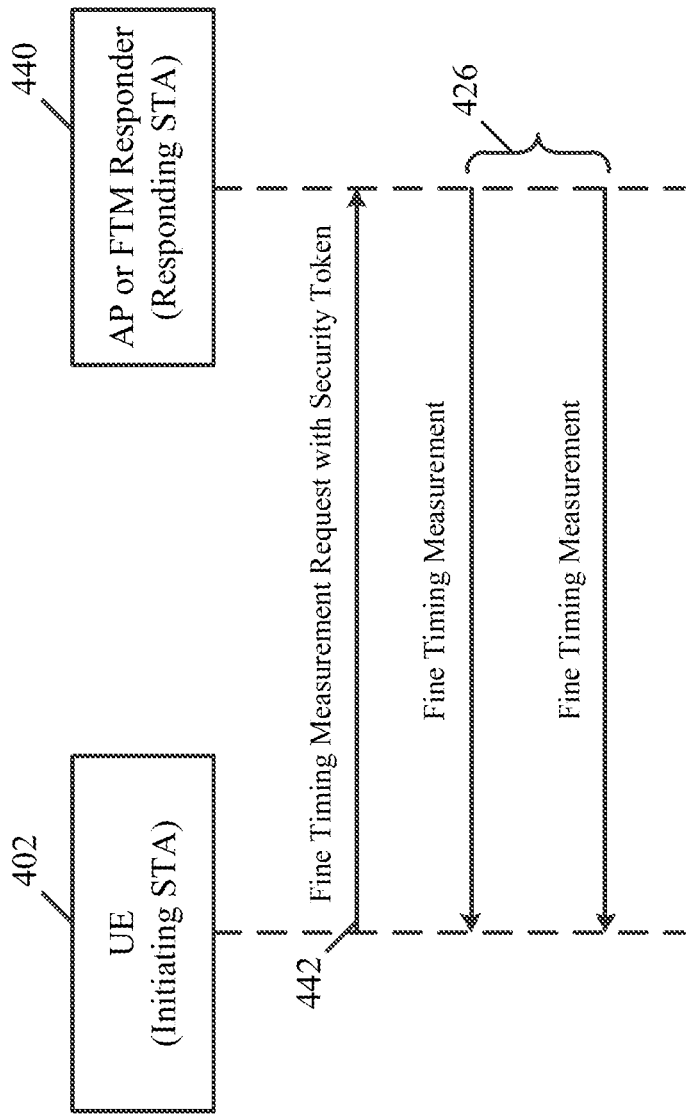
FIG. 4 is a schematic illustration of an FTM procedure, in accordance with some demonstrative embodiments.

Reference is made to FIG. 4, which schematically illustrates an FTM procedure 400, in accordance with some demonstrative embodiments. For example, FTM procedure 400 may enable a responder 440 to authenticate an initiator 402. For example, initiator 402 may perform the functionality of device 102 (FIG. 1); and/or responder 440 may perform the functionality of device 140 (FIG. 1).

In some demonstrative embodiments, as shown in FIG. 4, the initiator 402 may transmit an FTM request message 442 to the responder device 440. For example, device 102 (FIG. 1) may transmit FTM request 442 to device 140 (FIG. 1).

In some demonstrative embodiments, as shown in FIG. 4, FTM request message 442 may include an initiator security token.

In some demonstrative embodiments, initiator 402 may generate the initiator security token, to cryptographically encompass one or more parameters, e.g., some or all, of the parameters described below.

In some demonstrative embodiments, the parameters may include an indication of an address of initiator 402, e.g., MAC Address of initiator 402 or any other identifier or address of initiator 402.

In some demonstrative embodiments, the parameters may include an indication of an address of responder 440, e.g., a MAC Address of responder 440 or any other identifier or address of responder 440.

In some demonstrative embodiments, the parameters may include an Agreed secret, e.g., a public/private key pair, and/or any other key information, generated by an enterprise, e.g., an enterprise owning responder 440, or any other entity.

In some demonstrative embodiments, the parameters may include time related information, for example, a TSF time or any other time value, e.g., to prevent replay attacks.

In some demonstrative embodiments, responder 440 may be configured to determine authenticity of initiator 402, e.g., based on the initiator security token in the FTM request 442.

In some demonstrative embodiments, as shown in FIG. 4, responder 440 may be configured to proceed with FTM procedure 400, e.g., by transmitting one or more FTM measurement frames 426, for example, if responder 440 concludes that the initiator 402 is genuine, e.g., based on the initiator security token.

In some demonstrative embodiments, responder 440 may be configured to reject the request to perform the FTM procedure 400, for example, if responder 440 concludes that the Initiator 420 is not genuine, e.g., based on the initiator security token.

Figure 5:
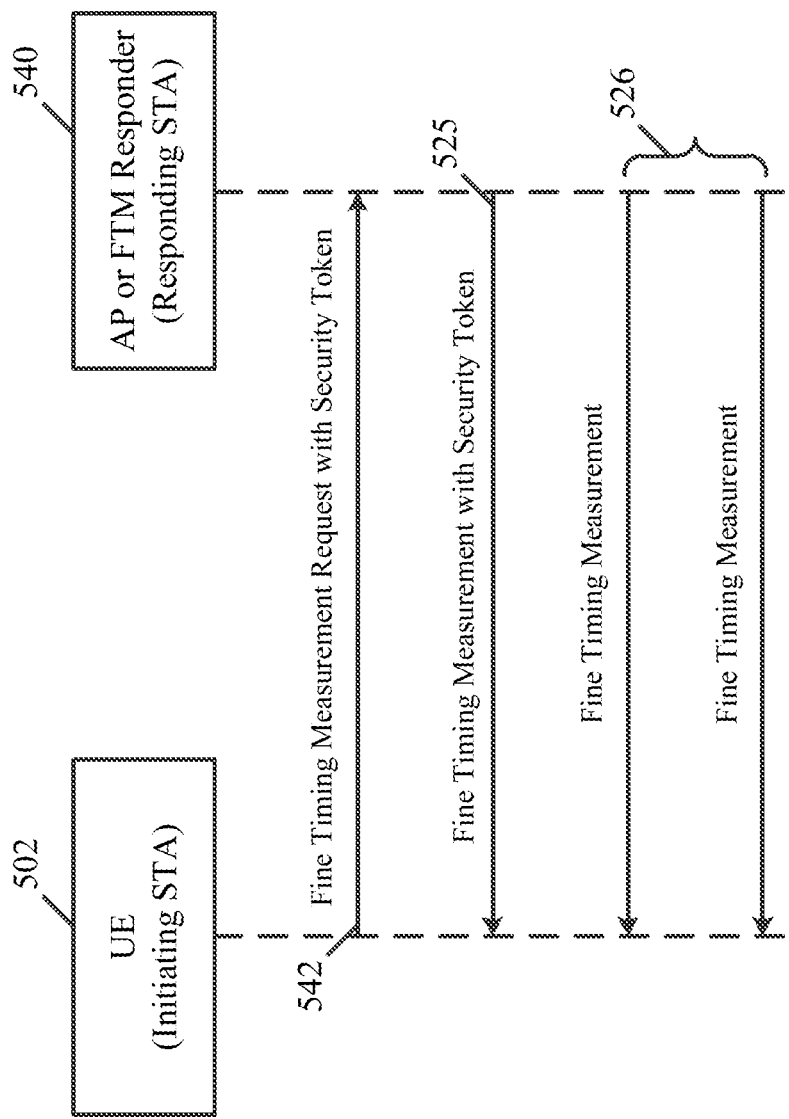
FIG. 5 is a schematic illustration of an FTM procedure, in accordance with some demonstrative embodiments.

Reference is made to FIG. 5, which schematically illustrates an FTM procedure 500, in accordance with some demonstrative embodiments. For example, FTM procedure 500 may enable a responder 540 to authenticate an initiator 502, and may enable the initiator 502 to authenticate the responder 540. For example, initiator 502 may perform the functionality of device 102 (FIG. 1); and/or responder 540 may perform the functionality of device 140 (FIG. 1).

In some demonstrative embodiments, as shown in FIG. 5, the initiator 502 may transmit an FTM request message 542 to the responder device 540. For example, device 102 (FIG. 1) may transmit FTM request 542 to device 140 (FIG. 1).

In some demonstrative embodiments, as shown in FIG. 5, FTM request message 542 may include an initiator security token.

In some demonstrative embodiments, initiator 502 may generate the initiator security token, to cryptographically encompass one or more parameters, e.g., some or all, of the parameters described below.

In some demonstrative embodiments, the parameters may include an indication of an address of initiator 502, e.g., MAC Address of initiator 502, or any other identifier or address of initiator 502.

In some demonstrative embodiments, the parameters may include an indication of an address of responder 540, e.g., a MAC Address of responder 540, or any other identifier or address of responder 540.

In some demonstrative embodiments, the parameters may include an Agreed secret, e.g., a public/private key pair, or any other key information, generated by an enterprise, e.g., an enterprise owning responder 540, or any other entity.

In some demonstrative embodiments, the parameters may include time related information, for example, a TSF time or any other time value, e.g., to prevent replay attacks.

In some demonstrative embodiments, responder 540 may be configured to determine authenticity of initiator 502, e.g., based on the initiator security token in the FTM request 542.

In some demonstrative embodiments, as shown in FIG. 5, responder 540 may be configured to proceed with FTM procedure 500, for example, if responder 540 concludes that the initiator 502 is genuine, e.g., based on the initiator security token.

In some demonstrative embodiments, as shown in FIG. 5, responder 540 may be configured to transmit an FTM measurement frame 525, for example, if responder 540 concludes that the initiator 502 is genuine, e.g., based on the initiator security token.

In some demonstrative embodiments, as shown in FIG. 5, FTM measurement frame 525 and/or one or more subsequent FTM measurement frames 536 may include a responder security token, e.g., to enable initiator 502 to authenticate responder 540.

In some demonstrative embodiments, responder 540 may generate the responder security token, to cryptographically encompass one or more parameters, e.g., some or all, of the parameters described below.

In some demonstrative embodiments, the parameters may include an indication of an address of initiator 502, e.g., MAC Address of initiator 502, or any other identifier or address of initiator 502.

In some demonstrative embodiments, the parameters may include an indication of an address of responder 540, e.g., a MAC Address of responder 540, or any other identifier or address of responder 540.

In some demonstrative embodiments, the parameters may include an Agreed secret, e.g., a public/private key pair generated by an enterprise, e.g., an enterprise owning responder 540, or any other entity.

In some demonstrative embodiments, the parameters may include time related information, for example, a TSF time or any other time value, e.g., to prevent replay attacks.

In some demonstrative embodiments, responder 540 may use the initiator Security Token as a seed for the responder Security Token, for example, instead of using an arbitrary Challenge Token.

In some demonstrative embodiments, responder 540 may use the initiator Security Token, e.g., in addition to the one or more parameters, for example, to determine the responder security token.

In some demonstrative embodiments, as shown in FIG. 5, initiator 402 may receive one or more FTM measurement frames 525 and/or 526 from responder 540, for example, if responder and initiator 502 authenticate each other.

Reference is made to FIG. 6A, which schematically illustrates a structure 610 of an FTM request message, and to FIG. 6B which schematically illustrates a structure 620 of an FTM measurement frame, in accordance with some demonstrative embodiments.

In some demonstrative embodiments, structure 610 and 620 may be configured in accordance with respective structures of an FTM request message and an FTM measurement frame, e.g., in accordance with an *IEEE* 802.11 *standard*.

In some demonstrative embodiments, as shown in FIG. 6A, FTM request message structure 610 may include a challenge token field 612 and/or a security token field 614.

In one example, initiator 302 (FIG. 3) may transmit FTM request message 332 (FIG. 3) having structure 610 including the challenge token in the challenge token field 612.

In another example, initiator 402 (FIG. 4) may transmit FTM request message 442 (FIG. 4) having structure 610 including the initiator security token in the security token field 614.

In another example, initiator 502 (FIG. 5) may transmit FTM request message 542 (FIG. 5) including structure 610 having the initiator security token in the security token field 614.

In some demonstrative embodiments, as shown in FIG. 6B, FTM measurement frame structure 620 may include a security token field 622.

In one example, responder 340 (FIG. 3) may transmit to initiator 302 (FIG. 3) the FTM measurement frame 334 (FIG. 3) having structure 620 including the security token in the security token field 622.

In another example, responder 540 (FIG. 5) may transmit to initiator 502 (FIG. 5) the FTM measurement frame 525 (FIG. 5) having structure 620 including the responder security token in the security token field 622.

Figure 7A:
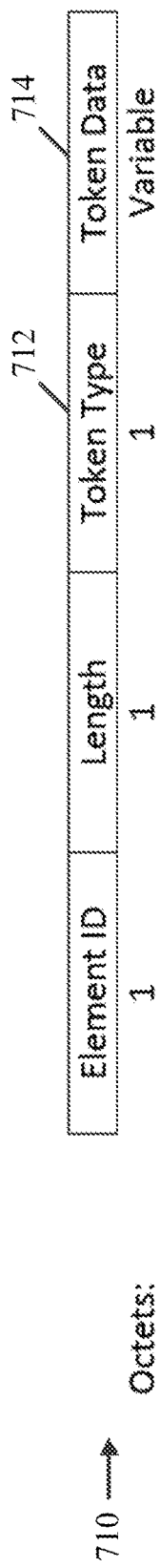
FIG. 7A is a schematic illustration of a challenge token information element (IE)
Figure 7B:
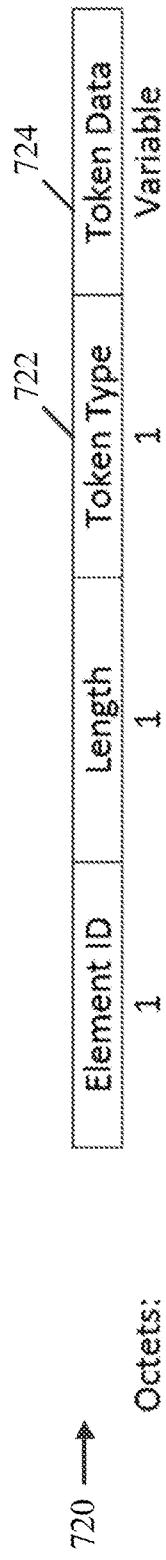
FIG. 7B is a schematic illustration of a security token IE, in accordance with some demonstrative embodiments.

Reference is made to FIG. 7A, which schematically illustrates a challenge token information element (IE) 710, and to FIG. 7B, which schematically illustrates a security token IE 720, in accordance with some demonstrative embodiments.

In some demonstrative embodiments, as shown in FIG. 7A, challenge token IE 710 may include a token type field 712, and/or a token data field 714.

In one example, initiator 302 (FIG. 3) may transmit FTM request message 332 (FIG. 3) including IE 710 including the challenge token, e.g., in field 714.

In some demonstrative embodiments, as shown in FIG. 7B, security token IE 720 may include a token type field 722 and/or a token data field 724.

In one example, initiator 402 (FIG. 4) may transmit FTM request message 442 (FIG. 4) including IE 720 including the initiator security token, e.g., in field 724.

In one example, initiator 502 (FIG. 5) may transmit FTM request message 542 (FIG. 5) including IE 720 including the initiator security token, e.g., in field 724.

In another example, responder 540 (FIG. 5) may transmit to initiator 502 (FIG. 5) the FTM measurement frame 525 (FIG. 5) including IE 720 including the responder security token, e.g., in filed 724.

Figure 8:
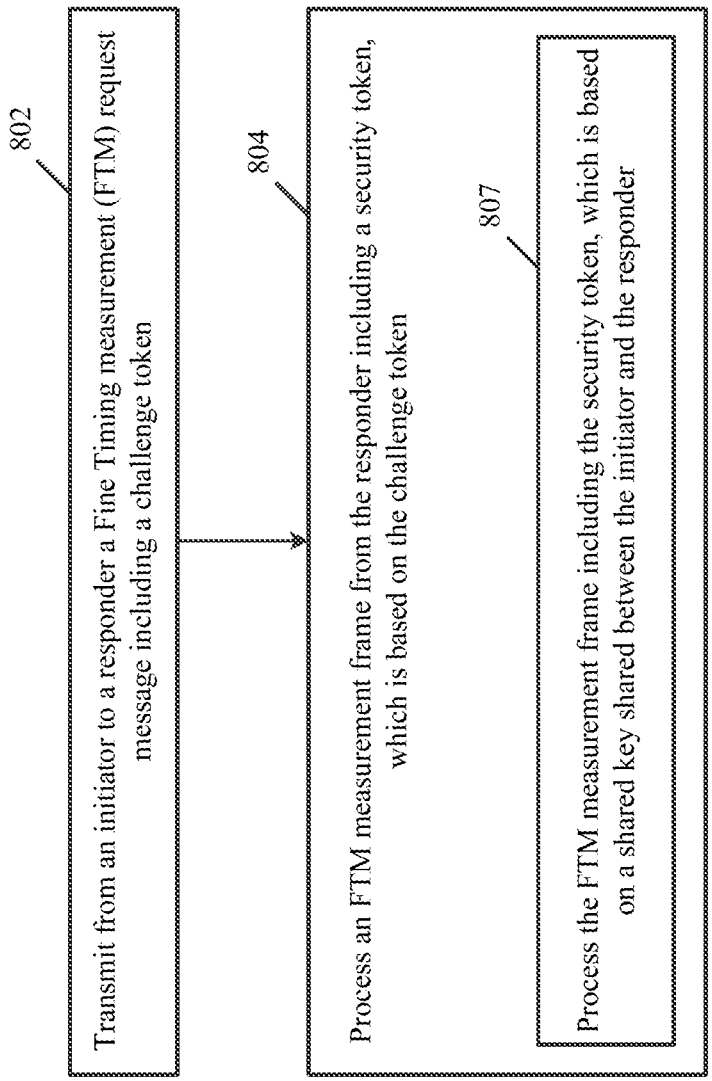
FIG. 8 is a schematic flow-chart illustration of a method of an FTM, in accordance with some demonstrative embodiments.

Reference is made to FIG. 8, which schematically illustrates a method of FTM, in accordance with some demonstrative embodiments. For example, one or more of the operations of the method of FIG. 8 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an FTM component, e.g., FTM components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 802, the method may include transmitting from an initiator to a responder an FTM request message including a challenge token. For example, FTM component 117 (FIG. 1) may control, cause and/or trigger device 102 to transmit the FTM request message including the challenge token to device 140 (FIG. 1), e.g., as described above.

As indicated at block 804, the method may include processing an FTM measurement frame from the responder including a security token, which is based on the challenge token. For example, FTM component 117 (FIG. 1) may control, cause and/or trigger device 102 (FIG. 1) to process the FTM measurement frame from device 140 (FIG. 1) including the security token, which is based on the challenge token, e.g., as described above.

As indicated at block 807, processing the FTM measurement frame may include processing the FTM measurement frame including the security token, which is based on shared key information shared between the initiator and the responder. For example, FTM component 117 (FIG. 1) may control, cause and/or trigger device 102 (FIG. 1) to process the FTM measurement frame including the security token, which is based on the shared key information, which is shared between devices 102 and 140 (FIG. 1), e.g., as described above.

Figure 9:
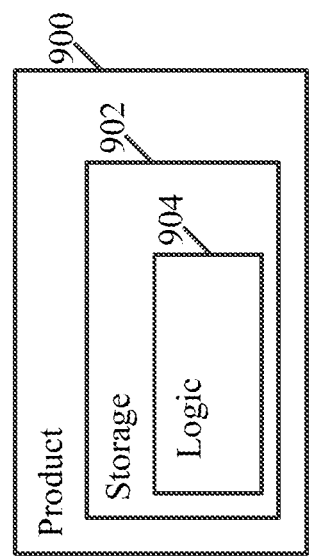
FIG. 9 is a schematic illustration of a product, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), FTM components 117 and/or 157 (FIG. 1), location estimator 115 (FIG. 1), and/or to perform one or more operations described above with reference to FIGS. 1, 2, 3, 4, 5, 6A, 6B, 7A, 7B, and/or 8, and/or one or more operations described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause an initiator station to transmit a Fine Timing Measurement (FTM) request message to a responder station, the FTM request message comprising a challenge token; process an FTM measurement frame received from the responder station, the FTM measurement frame comprising a security token, which is based on the challenge token; and authenticate the responder station based on the security token.

Example 2 includes the subject matter of Example 1, and optionally, wherein the security token is based on shared key information shared between the initiator station and the responder station.

Example 3 includes the subject matter of Example 2, and optionally, wherein the apparatus is configured to cause the initiator station to receive the shared key information from a certified entity.

Example 4 includes the subject matter of any one of Examples 1-3, and optionally, wherein the security token is based on a time value.

Example 5 includes the subject matter of Example 4, and optionally, wherein the time value is based on a Time Synchronization Function (TSF).

Example 6 includes the subject matter of any one of Examples 1-5, and optionally, wherein the security token is based on an address of the responder station.

Example 7 includes the subject matter of Example 6, and optionally, wherein the security token is based on an address of the initiator station.

Example 8 includes the subject matter of any one of Examples 1-7, and optionally, wherein the apparatus is configured to cause the initiator station to select to discontinue an FTM measurement procedure with the responder station, if the responder station is not successfully authenticated.

Example 9 includes the subject matter of any one of Examples 1-8, and optionally, wherein the apparatus is configured to cause the initiator station to use FTM information from the responder station, only if the responder station is successfully authenticated.

Example 10 includes the subject matter of any one of Examples 1-9, and optionally, wherein the apparatus is configured to cause the initiator station to generate the challenge token by encrypting a challenge value, and to determine the responder station is successfully authenticated, if the security token comprises the challenge value.

Example 11 includes the subject matter of any one of Examples 1-9, and optionally, wherein the challenge token comprises an arbitrary value.

Example 12 includes the subject matter of any one of Examples 1-11, and optionally, wherein the FTM request message comprises a challenge token field comprising the challenge token, and the FTM measurement frame comprises a security token field comprising the security token.

Example 13 includes the subject matter of any one of Examples 1-12, and optionally, wherein the apparatus is configured to cause the initiator station to determine a range between the initiator station and the responder station, based on the FTM measurement frame.

Example 14 includes the subject matter of any one of Examples 1-13, and optionally, comprising a radio to transmit the FTM request message, and to receive the FTM measurement frame.

Example 15 includes the subject matter of any one of Examples 1-14, and optionally, comprising one or more antennas, a memory, and a processor.

Example 16 includes a system of wireless communication comprising an initiator station, the initiator station comprising one or more antennas; a memory; a processor; a radio; and a controller configured to cause the initiator station to transmit a Fine Timing Measurement (FTM) request message to a responder station, the FTM request message comprising a challenge token; process an FTM measurement frame received from the responder station, the FTM measurement frame comprising a security token, which is based on the challenge token; and authenticate the responder station based on the security token.

Example 17 includes the subject matter of Example 16, and optionally, wherein the security token is based on shared key information shared between the initiator station and the responder station.

Example 18 includes the subject matter of Example 17, and optionally, wherein the initiator station is to receive the shared key information from a certified entity.

Example 19 includes the subject matter of any one of Examples 16-18, and optionally, wherein the security token is based on a time value.

Example 20 includes the subject matter of Example 19, and optionally, wherein the time value is based on a Time Synchronization Function (TSF).

Example 21 includes the subject matter of any one of Examples 16-20, and optionally, wherein the security token is based on an address of the responder station.

Example 22 includes the subject matter of Example 21, and optionally, wherein the security token is based on an address of the initiator station.

Example 23 includes the subject matter of any one of Examples 16-22, and optionally, wherein the initiator station is to select to discontinue an FTM measurement procedure with the responder station, if the responder station is not successfully authenticated.

Example 24 includes the subject matter of any one of Examples 16-23, and optionally, wherein the initiator station is to use FTM information from the responder station, only if the responder station is successfully authenticated.

Example 25 includes the subject matter of any one of Examples 16-23, and optionally, wherein the initiator station is to generate the challenge token by encrypting a challenge value, and to determine the responder station is successfully authenticated, if the security token comprises the challenge value.

Example 26 includes the subject matter of any one of Examples 16-23, and optionally, wherein the challenge token comprises an arbitrary value.

Example 27 includes the subject matter of any one of Examples 16-26, and optionally, wherein the FTM request message comprises a challenge token field comprising the challenge token, and the FTM measurement frame comprises a security token field comprising the security token.

Example 28 includes the subject matter of any one of Examples 16-27, and optionally, wherein the initiator station is to determine a range between the initiator station and the responder station, based on the FTM measurement frame.

Example 29 includes a method to be performed at an initiator station, the method comprising transmitting a Fine Timing Measurement (FTM) request message to a responder station, the FTM request message comprising a challenge token; processing an FTM measurement frame received from the responder station, the FTM measurement frame comprising a security token, which is based on the challenge token; and authenticating the responder station based on the security token.

Example 30 includes the subject matter of Example 29, and optionally, wherein the security token is based on shared key information shared between the initiator station and the responder station.

Example 31 includes the subject matter of Example 30, and optionally, comprising receiving the shared key information from a certified entity.

Example 32 includes the subject matter of any one of Examples 29-31, and optionally, wherein the security token is based on a time value.

Example 33 includes the subject matter of Example 32, and optionally, wherein the time value is based on a Time Synchronization Function (TSF).

Example 34 includes the subject matter of any one of Examples 29-33, and optionally, wherein the security token is based on an address of the responder station.

Example 35 includes the subject matter of Example 34, and optionally, wherein the security token is based on an address of the initiator station.

Example 36 includes the subject matter of any one of Examples 29-35, and optionally, comprising selecting to discontinue an FTM measurement procedure with the responder station, if the responder station is not successfully authenticated.

Example 37 includes the subject matter of any one of Examples 29-36, and optionally, comprising using FTM information from the responder station, only if the responder station is successfully authenticated.

Example 38 includes the subject matter of any one of Examples 29-36, and optionally, comprising generating the challenge token by encrypting a challenge value, and determining the responder station is successfully authenticated, if the security token comprises the challenge value.

Example 39 includes the subject matter of any one of Examples 29-36, and optionally, wherein the challenge token comprises an arbitrary value.

Example 40 includes the subject matter of any one of Examples 29-39, and optionally, wherein the FTM request message comprises a challenge token field comprising the challenge token, and the FTM measurement frame comprises a security token field comprising the security token.

Example 41 includes the subject matter of any one of Examples 29-40, and optionally, comprising determining a range between the initiator station and the responder station, based on the FTM measurement frame.

Example 42 includes a product including one or more tangible computer-readable non-transitory storage media comprising computer-executable instructions operable to, when executed by at least one computer processor, enable the at least one computer processor to implement operations at an initiator station, the operations comprising transmitting a Fine Timing Measurement (FTM) request message to a responder station, the FTM request message comprising a challenge token; processing an FTM measurement frame received from the responder station, the FTM measurement frame comprising a security token, which is based on the challenge token; and authenticating the responder station based on the security token.

Example 43 includes the subject matter of Example 42, and optionally, wherein the security token is based on shared key information shared between the initiator station and the responder station.

Example 44 includes the subject matter of Example 43, and optionally, wherein the operations comprise receiving the shared key information from a certified entity.

Example 45 includes the subject matter of any one of Examples 42-44, and optionally, wherein the security token is based on a time value.

Example 46 includes the subject matter of Example 45, and optionally, wherein the time value is based on a Time Synchronization Function (TSF).

Example 47 includes the subject matter of any one of Examples 42-46, and optionally, wherein the security token is based on an address of the responder station.

Example 48 includes the subject matter of Example 47, and optionally, wherein the security token is based on an address of the initiator station.

Example 49 includes the subject matter of any one of Examples 42-48, and optionally, wherein the operations comprise selecting to discontinue an FTM measurement procedure with the responder station, if the responder station is not successfully authenticated.

Example 50 includes the subject matter of any one of Examples 42-49, and optionally, wherein the operations comprise using FTM information from the responder station, only if the responder station is successfully authenticated.

Example 51 includes the subject matter of any one of Examples 42-49, and optionally, wherein the operations comprise generating the challenge token by encrypting a challenge value, and determining the responder station is successfully authenticated, if the security token comprises the challenge value.

Example 52 includes the subject matter of any one of Examples 42-49, and optionally, wherein the challenge token comprises an arbitrary value.

Example 53 includes the subject matter of any one of Examples 42-52, and optionally, wherein the FTM request message comprises a challenge token field comprising the challenge token, and the FTM measurement frame comprises a security token field comprising the security token.

Example 54 includes the subject matter of any one of Examples 42-53, and optionally, wherein the operations comprise determining a range between the initiator station and the responder station, based on the FTM measurement frame.

Example 55 includes an apparatus of wireless communication by an initiator station, the apparatus comprising means for transmitting a Fine Timing Measurement (FTM) request message to a responder station, the FTM request message comprising a challenge token; means for processing an FTM measurement frame received from the responder station, the FTM measurement frame comprising a security token, which is based on the challenge token; and means for authenticating the responder station based on the security token.

Example 56 includes the subject matter of Example 55, and optionally, wherein the security token is based on shared key information shared between the initiator station and the responder station.

Example 57 includes the subject matter of Example 56, and optionally, comprising means for receiving the shared key information from a certified entity.

Example 58 includes the subject matter of any one of Examples 55-57, and optionally, wherein the security token is based on a time value.

Example 59 includes the subject matter of Example 58, and optionally, wherein the time value is based on a Time Synchronization Function (TSF).

Example 60 includes the subject matter of any one of Examples 55-59, and optionally, wherein the security token is based on an address of the responder station.

Example 61 includes the subject matter of Example 60, and optionally, wherein the security token is based on an address of the initiator station.

Example 62 includes the subject matter of any one of Examples 55-61, and optionally, comprising means for selecting to discontinue an FTM measurement procedure with the responder station, if the responder station is not successfully authenticated.

Example 63 includes the subject matter of any one of Examples 55-62, and optionally, comprising means for using FTM information from the responder station, only if the responder station is successfully authenticated.

Example 64 includes the subject matter of any one of Examples 55-62, and optionally, comprising means for generating the challenge token by encrypting a challenge value, and determining the responder station is successfully authenticated, if the security token comprises the challenge value.

Example 65 includes the subject matter of any one of Examples 55-62, and optionally, wherein the challenge token comprises an arbitrary value.

Example 66 includes the subject matter of any one of Examples 55-65, and optionally, wherein the FTM request message comprises a challenge token field comprising the challenge token, and the FTM measurement frame comprises a security token field comprising the security token.

Example 67 includes the subject matter of any one of Examples 55-66, and optionally, comprising means for determining a range between the initiator station and the responder station, based on the FTM measurement frame.

Example 68 includes an apparatus comprising circuitry and logic configured to cause an initiator station to generate an initiator security token based on a time value, and shared key information shared between the initiator station and a responder station; and transmit an FTM request message to the responder station, the FTM request message comprising the initiator security token.

Example 69 includes the subject matter of Example 68, and optionally, wherein the initiator security token is based on an address of the initiator station.

Example 70 includes the subject matter of Example 69, and optionally, wherein the initiator security token is based on an address of the responder station.

Example 71 includes the subject matter of any one of Examples 68-70, and optionally, wherein the apparatus is configured to cause the initiator station to receive the shared key information from a certified entity.

Example 72 includes the subject matter of any one of Examples 68-71, and optionally, wherein the time value is based on a Time Synchronization Function (TSF).

Example 73 includes the subject matter of any one of Examples 68-72, and optionally, wherein the apparatus is configured to cause the initiator station to process an FTM measurement frame received from the responder station, the FTM measurement frame is in response to the FTM request message.

Example 74 includes the subject matter of Example 73, and optionally, wherein the FTM measurement frame comprises a responder security token.

Example 75 includes the subject matter of Example 74, and optionally, wherein the apparatus is configured to cause the initiator station to authenticate the responder station, based on the responder security token.

Example 76 includes the subject matter of Example 75, and optionally, wherein the apparatus is configured to cause the initiator station to use FTM information from the responder station, if the responder station is successfully authenticated.

Example 77 includes the subject matter of Example 75 or 76, and optionally, wherein the apparatus is configured to cause the initiator station to select to discontinue an FTM measurement procedure with the responder station, if the responder station is not successfully authenticated.

Example 78 includes the subject matter of any one of Examples 74-77, and optionally, wherein the responder security token is based on the initiator security token.

Example 79 includes the subject matter of any one of Examples 74-78, and optionally, wherein the responder security token is based on the shared key information.

Example 80 includes the subject matter of any one of Examples 74-79, and optionally, wherein the responder security token is based on an address of the responder station.

Example 81 includes the subject matter of Example 80, and optionally, wherein the responder security token is based on an address of the initiator station.

Example 82 includes the subject matter of any one of Examples 73-81, and optionally, wherein the apparatus is configured to cause the initiator station to determine a range between the initiator station and the responder station, based on the FTM measurement frame.

Example 83 includes the subject matter of any one of Examples 68-82, and optionally, comprising a radio to transmit the FTM request message.

Example 84 includes the subject matter of any one of Examples 68-83, and optionally, comprising one or more antennas, a memory, and a processor.

Example 85 includes a system of wireless communication comprising an initiator station, the initiator station comprising one or more antennas; a memory; a processor; a radio; and a controller configured to cause the initiator station to generate an initiator security token based on a time value, and shared key information shared between the initiator station and a responder station; and transmit an FTM request message to the responder station, the FTM request message comprising the initiator security token.

Example 86 includes the subject matter of Example 85, and optionally, wherein the initiator security token is based on an address of the initiator station.

Example 87 includes the subject matter of Example 86, and optionally, wherein the initiator security token is based on an address of the responder station.

Example 88 includes the subject matter of any one of Examples 85-87, and optionally, wherein the initiator station is to receive the shared key information from a certified entity.

Example 89 includes the subject matter of any one of Examples 85-88, and optionally, wherein the time value is based on a Time Synchronization Function (TSF).

Example 90 includes the subject matter of any one of Examples 85-89, and optionally, wherein the initiator station is to process an FTM measurement frame received from the responder station, the FTM measurement frame is in response to the FTM request message.

Example 91 includes the subject matter of Example 90, and optionally, wherein the FTM measurement frame comprises a responder security token.

Example 92 includes the subject matter of Example 91, and optionally, wherein the initiator station is to authenticate the responder station, based on the responder security token.

Example 93 includes the subject matter of Example 92, and optionally, wherein the initiator station is to use FTM information from the responder station, if the responder station is successfully authenticated.

Example 94 includes the subject matter of Example 92 or 93, and optionally, wherein the initiator station is to select to discontinue an FTM measurement procedure with the responder station, if the responder station is not successfully authenticated.

Example 95 includes the subject matter of any one of Examples 91-94, and optionally, wherein the responder security token is based on the initiator security token.

Example 96 includes the subject matter of any one of Examples 91-95, and optionally, wherein the responder security token is based on the shared key information.

Example 97 includes the subject matter of any one of Examples 91-96, and optionally, wherein the responder security token is based on an address of the responder station.

Example 98 includes the subject matter of Example 97, and optionally, wherein the responder security token is based on an address of the initiator station.

Example 99 includes the subject matter of any one of Examples 90-98, and optionally, wherein the initiator station is to determine a range between the initiator station and the responder station, based on the FTM measurement frame.

Example 100 includes a method to be performed at an initiator station, the method comprising generating an initiator security token based on a time value, and shared key information shared between the initiator station and a responder station; and transmitting an FTM request message to the responder station, the FTM request message comprising the initiator security token.

Example 101 includes the subject matter of Example 100, and optionally, wherein the initiator security token is based on an address of the initiator station.

Example 102 includes the subject matter of Example 101, and optionally, wherein the initiator security token is based on an address of the responder station.

Example 103 includes the subject matter of any one of Examples 100-102, and optionally, comprising receiving the shared key information from a certified entity.

Example 104 includes the subject matter of any one of Examples 100-103, and optionally, wherein the time value is based on a Time Synchronization Function (TSF).

Example 105 includes the subject matter of any one of Examples 100-104, and optionally, comprising processing an FTM measurement frame received from the responder station, the FTM measurement frame is in response to the FTM request message.

Example 106 includes the subject matter of Example 105, and optionally, wherein the FTM measurement frame comprises a responder security token.

Example 107 includes the subject matter of Example 106, and optionally, comprising authenticating the responder station, based on the responder security token.

Example 108 includes the subject matter of Example 107, and optionally, comprising using FTM information from the responder station, if the responder station is successfully authenticated.

Example 109 includes the subject matter of Example 107 or 108, and optionally, comprising selecting to discontinue an FTM measurement procedure with the responder station, if the responder station is not successfully authenticated.

Example 110 includes the subject matter of any one of Examples 106-109, and optionally, wherein the responder security token is based on the initiator security token.

Example 111 includes the subject matter of any one of Examples 106-110, and optionally, wherein the responder security token is based on the shared key information.

Example 112 includes the subject matter of any one of Examples 106-111, and optionally, wherein the responder security token is based on an address of the responder station.

Example 113 includes the subject matter of Example 112, and optionally, wherein the responder security token is based on an address of the initiator station.

Example 114 includes the subject matter of any one of Examples 105-113, and optionally, comprising determining a range between the initiator station and the responder station, based on the FTM measurement frame.

Example 115 includes a product including one or more tangible computer-readable non-transitory storage media comprising computer-executable instructions operable to, when executed by at least one computer processor, enable the at least one computer processor to implement operations at an initiator station, the operations comprising generating an initiator security token based on a time value, and shared key information shared between the initiator station and a responder station; and transmitting an FTM request message to the responder station, the FTM request message comprising the initiator security token.

Example 116 includes the subject matter of Example 115, and optionally, wherein the initiator security token is based on an address of the initiator station.

Example 117 includes the subject matter of Example 116, and optionally, wherein the initiator security token is based on an address of the responder station.

Example 118 includes the subject matter of any one of Examples 115-117, and optionally, wherein the operations comprise receiving the shared key information from a certified entity.

Example 119 includes the subject matter of any one of Examples 115-118, and optionally, wherein the time value is based on a Time Synchronization Function (TSF).

Example 120 includes the subject matter of any one of Examples 115-119, and optionally, wherein the operations comprise processing an FTM measurement frame received from the responder station, the FTM measurement frame is in response to the FTM request message.

Example 121 includes the subject matter of Example 120, and optionally, wherein the FTM measurement frame comprises a responder security token.

Example 122 includes the subject matter of Example 121, and optionally, wherein the operations comprise authenticating the responder station, based on the responder security token.

Example 123 includes the subject matter of Example 122, and optionally, wherein the operations comprise using FTM information from the responder station, if the responder station is successfully authenticated.

Example 124 includes the subject matter of Example 122 or 123, and optionally, wherein the operations comprise selecting to discontinue an FTM measurement procedure with the responder station, if the responder station is not successfully authenticated.

Example 125 includes the subject matter of any one of Examples 121-124, and optionally, wherein the responder security token is based on the initiator security token.

Example 126 includes the subject matter of any one of Examples 121-125, and optionally, wherein the responder security token is based on the shared key information.

Example 127 includes the subject matter of any one of Examples 121-126, and optionally, wherein the responder security token is based on an address of the responder station.

Example 128 includes the subject matter of Example 127, and optionally, wherein the responder security token is based on an address of the initiator station.

Example 129 includes the subject matter of any one of Examples 120-128, and optionally, wherein the operations comprise determining a range between the initiator station and the responder station, based on the FTM measurement frame.

Example 130 includes an apparatus of wireless communication by an initiator station, the apparatus comprising means for generating an initiator security token based on a time value, and shared key information shared between the initiator station and a responder station; and means for transmitting an FTM request message to the responder station, the FTM request message comprising the initiator security token.

Example 131 includes the subject matter of Example 130, and optionally, wherein the initiator security token is based on an address of the initiator station.

Example 132 includes the subject matter of Example 131, and optionally, wherein the initiator security token is based on an address of the responder station.

Example 133 includes the subject matter of any one of Examples 130-132, and optionally, comprising means for receiving the shared key information from a certified entity.

Example 134 includes the subject matter of any one of Examples 130-133, and optionally, wherein the time value is based on a Time Synchronization Function (TSF).

Example 135 includes the subject matter of any one of Examples 130-134, and optionally, comprising means for processing an FTM measurement frame received from the responder station, the FTM measurement frame is in response to the FTM request message.

Example 136 includes the subject matter of Example 135, and optionally, wherein the FTM measurement frame comprises a responder security token.

Example 137 includes the subject matter of Example 136, and optionally, comprising means for authenticating the responder station, based on the responder security token.

Example 138 includes the subject matter of Example 137, and optionally, comprising means for using FTM information from the responder station, if the responder station is successfully authenticated.

Example 139 includes the subject matter of Example 137 or 138, and optionally, comprising means for selecting to discontinue an FTM measurement procedure with the responder station, if the responder station is not successfully authenticated.

Example 140 includes the subject matter of any one of Examples 136-139, and optionally, wherein the responder security token is based on the initiator security token.

Example 141 includes the subject matter of any one of Examples 136-140, and optionally, wherein the responder security token is based on the shared key information.

Example 142 includes the subject matter of any one of Examples 136-141, and optionally, wherein the responder security token is based on an address of the responder station.

Example 143 includes the subject matter of Example 142, and optionally, wherein the responder security token is based on an address of the initiator station.

Example 144 includes the subject matter of any one of Examples 135-143, and optionally, comprising means for determining a range between the initiator station and the responder station, based on the FTM measurement frame.

Example 145 includes an apparatus comprising circuitry and logic configured to cause a responder station to process a Fine Timing Measurement (FTM) request message received from an initiator station, the FTM request message comprising a challenge token; determine a security token based on the challenge token; and transmit an FTM measurement frame to the initiator station, the FTM measurement frame comprising the security token.

Example 146 includes the subject matter of Example 145, and optionally, wherein the apparatus is configured to cause the responder station to determine the security token based on shared key information shared between the initiator station and the responder station.

Example 147 includes the subject matter of Example 146, and optionally, wherein the apparatus is configured to cause the responder station to receive the shared key information from a certified entity.

Example 148 includes the subject matter of any one of Examples 145-147, and optionally, wherein the apparatus is configured to cause the responder station to determine the security token based on a time value.

Example 149 includes the subject matter of Example 148, and optionally, wherein the time value is based on a Time Synchronization Function (TSF).

Example 150 includes the subject matter of any one of Examples 145-149, and optionally, wherein the apparatus is configured to cause the responder station to determine the security token based on an address of the responder station.

Example 151 includes the subject matter of Example 150, and optionally, wherein the apparatus is configured to cause the responder station to determine the security token based on an address of the initiator station.

Example 152 includes the subject matter of any one of Examples 145-151, and optionally, wherein the apparatus is configured to cause the responder station to determine a challenge value by decrypting the challenge token, and to transmit the FTM measurement frame including the challenge value.

Example 153 includes the subject matter of any one of Examples 145-151, and optionally, wherein the challenge token comprises an arbitrary value.

Example 154 includes the subject matter of any one of Examples 145-153, and optionally, comprising a radio to receive the FTM request message, and to transmit the FTM measurement frame.

Example 155 includes the subject matter of any one of Examples 145-154, and optionally, comprising one or more antennas, a memory, and a processor.

Example 156 includes a system of wireless communication comprising a responder station, the responder station comprising one or more antennas; a memory; a processor; a radio; and a controller configured to cause the responder station to process a Fine Timing Measurement (FTM) request message received from an initiator station, the FTM request message comprising a challenge token; determine a security token based on the challenge token; and transmit an FTM measurement frame to the initiator station, the FTM measurement frame comprising the security token.

Example 157 includes the subject matter of Example 156, and optionally, wherein the responder station is to determine the security token based on shared key information shared between the initiator station and the responder station.

Example 158 includes the subject matter of Example 157, and optionally, wherein the responder station is to receive the shared key information from a certified entity.

Example 159 includes the subject matter of any one of Examples 156-158, and optionally, wherein the responder station is to determine the security token based on a time value.

Example 160 includes the subject matter of Example 159, and optionally, wherein the time value is based on a Time Synchronization Function (TSF).

Example 161 includes the subject matter of any one of Examples 156-160, and optionally, wherein the responder station is to determine the security token based on an address of the responder station.

Example 162 includes the subject matter of Example 161, and optionally, wherein the responder station is to determine the security token based on an address of the initiator station.

Example 163 includes the subject matter of any one of Examples 156-162, and optionally, wherein the responder station is to determine a challenge value by decrypting the challenge token, and to transmit the FTM measurement frame including the challenge value.

Example 164 includes the subject matter of any one of Examples 156-162, and optionally, wherein the challenge token comprises an arbitrary value.

Example 165 includes a method to be performed at a responder station, the method comprising processing a Fine Timing Measurement (FTM) request message received from an initiator station, the FTM request message comprising a challenge token; determining a security token based on the challenge token; and transmitting an FTM measurement frame to the initiator station, the FTM measurement frame comprising the security token.

Example 166 includes the subject matter of Example 165, and optionally, comprising determining the security token based on shared key information shared between the initiator station and the responder station.

Example 167 includes the subject matter of Example 166, and optionally, comprising receiving the shared key information from a certified entity.

Example 168 includes the subject matter of any one of Examples 165-167, and optionally, comprising determining the security token based on a time value.

Example 169 includes the subject matter of Example 168, and optionally, wherein the time value is based on a Time Synchronization Function (TSF).

Example 170 includes the subject matter of any one of Examples 165-169, and optionally, comprising determining the security token based on an address of the responder station.

Example 171 includes the subject matter of Example 170, and optionally, comprising determining the security token based on an address of the initiator station.

Example 172 includes the subject matter of any one of Examples 165-171, and optionally, comprising determining a challenge value by decrypting the challenge token, and transmitting the FTM measurement frame including the challenge value.

Example 173 includes the subject matter of any one of Examples 165-171, and optionally, wherein the challenge token comprises an arbitrary value.

Example 174 includes a product including one or more tangible computer-readable non-transitory storage media comprising computer-executable instructions operable to, when executed by at least one computer processor, enable the at least one computer processor to implement operations at a responder station, the operations comprising processing a Fine Timing Measurement (FTM) request message received from an initiator station, the FTM request message comprising a challenge token; determining a security token based on the challenge token; and transmitting an FTM measurement frame to the initiator station, the FTM measurement frame comprising the security token.

Example 175 includes the subject matter of Example 174, and optionally, wherein the operations comprise determining the security token based on shared key information shared between the initiator station and the responder station.

Example 176 includes the subject matter of Example 175, and optionally, wherein the operations comprise receiving the shared key information from a certified entity.

Example 177 includes the subject matter of any one of Examples 174-176, and optionally, wherein the operations comprise determining the security token based on a time value.

Example 178 includes the subject matter of Example 177, and optionally, wherein the time value is based on a Time Synchronization Function (TSF).

Example 179 includes the subject matter of any one of Examples 174-178, and optionally, wherein the operations comprise determining the security token based on an address of the responder station.

Example 180 includes the subject matter of Example 179, and optionally, wherein the operations comprise determining the security token based on an address of the initiator station.

Example 181 includes the subject matter of any one of Examples 174-180, and optionally, wherein the operations comprise determining a challenge value by decrypting the challenge token, and transmitting the FTM measurement frame including the challenge value.

Example 182 includes the subject matter of any one of Examples 174-180, and optionally, wherein the challenge token comprises an arbitrary value.

Example 183 includes an apparatus of wireless communication by a responder station, the apparatus comprising means for processing a Fine Timing Measurement (FTM) request message received from an initiator station, the FTM request message comprising a challenge token; means for determining a security token based on the challenge token; and means for transmitting an FTM measurement frame to the initiator station, the FTM measurement frame comprising the security token.

Example 184 includes the subject matter of Example 183, and optionally, comprising means for determining the security token based on shared key information shared between the initiator station and the responder station.

Example 185 includes the subject matter of Example 184, and optionally, comprising means for receiving the shared key information from a certified entity.

Example 186 includes the subject matter of any one of Examples 183-185, and optionally, comprising means for determining the security token based on a time value.

Example 187 includes the subject matter of Example 186, and optionally, wherein the time value is based on a Time Synchronization Function (TSF).

Example 188 includes the subject matter of any one of Examples 183-187, and optionally, comprising means for determining the security token based on an address of the responder station.

Example 189 includes the subject matter of Example 188, and optionally, comprising means for determining the security token based on an address of the initiator station.

Example 190 includes the subject matter of any one of Examples 183-189, and optionally, comprising means for determining a challenge value by decrypting the challenge token, and transmitting the FTM measurement frame including the challenge value.

Example 191 includes the subject matter of any one of Examples 183-189, and optionally, wherein the challenge token comprises an arbitrary value.

Example 192 includes an apparatus comprising circuitry and logic configured to cause a responder station to process a Fine Timing Measurement (FTM) request message received from an initiator station, the FTM request message comprising an initiator security token; authenticate the initiator station based on the initiator security token; and transmit to the initiator station an FTM measurement frame, only if the initiator station is successfully authenticated.

Example 193 includes the subject matter of Example 192, and optionally, wherein the initiator security token is based on shared key information shared between the initiator station and the responder station.

Example 194 includes the subject matter of Example 192 or 193, and optionally, wherein the initiator security token is based on an address of the initiator station.

Example 195 includes the subject matter of Example 194, and optionally, wherein the initiator security token is based on an address of the responder station.

Example 196 includes the subject matter of any one of Examples 192-195, and optionally, wherein the initiator security token is based on a time value.

Example 197 includes the subject matter of Example 196, and optionally, wherein the time value is based on a Time Synchronization Function (TSF).

Example 198 includes the subject matter of any one of Examples 192-197, and optionally, wherein the FTM measurement frame comprises a responder security token.

Example 199 includes the subject matter of Example 198, and optionally, wherein the responder security token is based on the initiator security token.

Example 200 includes the subject matter of Example 198 or 199, and optionally, wherein the responder security token and the initiator security token are based on shared key information shared between the initiator station and the responder station.

Example 201 includes the subject matter of Example 200, and optionally, wherein the apparatus is configured to cause the responder station to receive the shared key information from a certified entity.

Example 202 includes the subject matter of any one of Examples 198-201, and optionally, wherein the responder security token is based on an address of the responder station.

Example 203 includes the subject matter of Example 202, and optionally, wherein the responder security token is based on an address of the initiator station.

Example 204 includes the subject matter of any one of Examples 192-203, and optionally, comprising a radio to receive the FTM request message and to transmit the FTM measurement frame.

Example 205 includes the subject matter of any one of Examples 192-204, and optionally, comprising one or more antennas, a memory, and a processor.

Example 206 includes a system of wireless communication comprising a responder station, the responder station comprising one or more antennas; a memory; a processor; a radio; and a controller configured to cause the responder station to process a Fine Timing Measurement (FTM) request message received from an initiator station, the FTM request message comprising an initiator security token; authenticate the initiator station based on the initiator security token; and transmit to the initiator station an FTM measurement frame, only if the initiator station is successfully authenticated.

Example 207 includes the subject matter of Example 206, and optionally, wherein the initiator security token is based on shared key information shared between the initiator station and the responder station.

Example 208 includes the subject matter of Example 206 or 207, and optionally, wherein the initiator security token is based on an address of the initiator station.

Example 209 includes the subject matter of Example 208, and optionally, wherein the initiator security token is based on an address of the responder station.

Example 210 includes the subject matter of any one of Examples 206-209, and optionally, wherein the initiator security token is based on a time value.

Example 211 includes the subject matter of Example 210, and optionally, wherein the time value is based on a Time Synchronization Function (TSF).

Example 212 includes the subject matter of any one of Examples 206-211, and optionally, wherein the FTM measurement frame comprises a responder security token.

Example 213 includes the subject matter of Example 212, and optionally, wherein the responder security token is based on the initiator security token.

Example 214 includes the subject matter of Example 212 or 213, and optionally, wherein the responder security token and the initiator security token are based on shared key information shared between the initiator station and the responder station.

Example 215 includes the subject matter of Example 214, and optionally, wherein the responder station is to receive the shared key information from a certified entity.

Example 216 includes the subject matter of any one of Examples 212-215, and optionally, wherein the responder security token is based on an address of the responder station.

Example 217 includes the subject matter of Example 216, and optionally, wherein the responder security token is based on an address of the initiator station.

Example 218 includes a method to be performed at a responder station, the method comprising processing a Fine Timing Measurement (FTM) request message received from an initiator station, the FTM request message comprising an initiator security token; authenticating the initiator station based on the initiator security token; and transmitting to the initiator station an FTM measurement frame, only if the initiator station is successfully authenticated.

Example 219 includes the subject matter of Example 218, and optionally, wherein the initiator security token is based on shared key information shared between the initiator station and the responder station.

Example 220 includes the subject matter of Example 218 or 219, and optionally, wherein the initiator security token is based on an address of the initiator station.

Example 221 includes the subject matter of Example 220, and optionally, wherein the initiator security token is based on an address of the responder station.

Example 222 includes the subject matter of any one of Examples 218-221, and optionally, wherein the initiator security token is based on a time value.

Example 223 includes the subject matter of Example 222, and optionally, wherein the time value is based on a Time Synchronization Function (TSF).

Example 224 includes the subject matter of any one of Examples 218-223, and optionally, wherein the FTM measurement frame comprises a responder security token.

Example 225 includes the subject matter of Example 224, and optionally, wherein the responder security token is based on the initiator security token.

Example 226 includes the subject matter of Example 224 or 225, and optionally, wherein the responder security token and the initiator security token are based on shared key information shared between the initiator station and the responder station.

Example 227 includes the subject matter of Example 226, and optionally, comprising receiving the shared key information from a certified entity.

Example 228 includes the subject matter of any one of Examples 224-227, and optionally, wherein the responder security token is based on an address of the responder station.

Example 229 includes the subject matter of Example 228, and optionally, wherein the responder security token is based on an address of the initiator station.

Example 230 includes a product including one or more tangible computer-readable non-transitory storage media comprising computer-executable instructions operable to, when executed by at least one computer processor, enable the at least one computer processor to implement operations at a responder station, the operations comprising processing a Fine Timing Measurement (FTM) request message received from an initiator station, the FTM request message comprising an initiator security token; authenticating the initiator station based on the initiator security token; and transmitting to the initiator station an FTM measurement frame, only if the initiator station is successfully authenticated.

Example 231 includes the subject matter of Example 230, and optionally, wherein the initiator security token is based on shared key information shared between the initiator station and the responder station.

Example 232 includes the subject matter of Example 230 or 231, and optionally, wherein the initiator security token is based on an address of the initiator station.

Example 233 includes the subject matter of Example 232, and optionally, wherein the initiator security token is based on an address of the responder station.

Example 234 includes the subject matter of any one of Examples 230-233, and optionally, wherein the initiator security token is based on a time value.

Example 235 includes the subject matter of Example 234, and optionally, wherein the time value is based on a Time Synchronization Function (TSF).

Example 236 includes the subject matter of any one of Examples 230-235, and optionally, wherein the FTM measurement frame comprises a responder security token.

Example 237 includes the subject matter of Example 236, and optionally, wherein the responder security token is based on the initiator security token.

Example 238 includes the subject matter of Example 236 or 237, and optionally, wherein the responder security token and the initiator security token are based on shared key information shared between the initiator station and the responder station.

Example 239 includes the subject matter of Example 238, and optionally, wherein the operations comprise receiving the shared key information from a certified entity.

Example 240 includes the subject matter of any one of Examples 236-239, and optionally, wherein the responder security token is based on an address of the responder station.

Example 241 includes the subject matter of Example 240, and optionally, wherein the responder security token is based on an address of the initiator station.

Example 242 includes an apparatus of wireless communication by a responder station, the apparatus comprising means for processing a Fine Timing Measurement (FTM) request message received from an initiator station, the FTM request message comprising an initiator security token; means for authenticating the initiator station based on the initiator security token; and means for transmitting to the initiator station an FTM measurement frame, only if the initiator station is successfully authenticated.

Example 243 includes the subject matter of Example 242, and optionally, wherein the initiator security token is based on shared key information shared between the initiator station and the responder station.

Example 244 includes the subject matter of Example 242 or 243, and optionally, wherein the initiator security token is based on an address of the initiator station.

Example 245 includes the subject matter of Example 244, and optionally, wherein the initiator security token is based on an address of the responder station.

Example 246 includes the subject matter of any one of Examples 242-245, and optionally, wherein the initiator security token is based on a time value.

Example 247 includes the subject matter of Example 246, and optionally, wherein the time value is based on a Time Synchronization Function (TSF).

Example 248 includes the subject matter of any one of Examples 242-247, and optionally, wherein the FTM measurement frame comprises a responder security token.

Example 249 includes the subject matter of Example 248, and optionally, wherein the responder security token is based on the initiator security token.

Example 250 includes the subject matter of Example 248 or 249, and optionally, wherein the responder security token and the initiator security token are based on shared key information shared between the initiator station and the responder station.

Example 251 includes the subject matter of Example 250, and optionally, comprising means for receiving the shared key information from a certified entity.

Example 252 includes the subject matter of any one of Examples 248-251, and optionally, wherein the responder security token is based on an address of the responder station.

Example 253 includes the subject matter of Example 252, and optionally, wherein the responder security token is based on an address of the initiator station.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause an initiator station to:
    transmit a Fine Timing Measurement (FTM) request message to a responder station, the FTM request message comprising a challenge token;
    process an FTM measurement frame received from said responder station, the FTM measurement frame comprising a security token, which is based on said challenge token; and
    authenticate said responder station based on said security token.

2. The apparatus of claim 1, wherein the security token is based on shared key information shared between the initiator station and the responder station.

3. The apparatus of claim 1, wherein the security token is based on a time value.

4. The apparatus of claim 1, wherein the security token is based on an address of said responder station.

5. The apparatus of claim 1 configured to cause the initiator station to select to discontinue an FTM measurement procedure with said responder station, when said responder station is not successfully authenticated.

6. The apparatus of claim 1 configured to cause the initiator station to use FTM information from said responder station, only when said responder station is successfully authenticated.

7. The apparatus of claim 1 configured to cause the initiator station to generate said challenge token by encrypting a challenge value, and to determine said responder station is successfully authenticated, when said security token comprises said challenge value.

8. The apparatus of claim 1, wherein the challenge token comprises an arbitrary value.

9. The apparatus of claim 1, wherein said FTM request message comprises a challenge token field comprising said challenge token, and said FTM measurement frame comprises a security token field comprising said security token.

10. The apparatus of claim 1 configured to cause the initiator station to determine a range between said initiator station and said responder station, based on said FTM measurement frame.

11. The apparatus of claim 1 comprising one or more antennas, a memory, and a processor.

12. An apparatus comprising circuitry and logic configured to cause an initiator station to:
    generate an initiator security token based on a time value, and shared key information shared between said initiator station and a responder station; and
    transmit a Fine Timing Measurement (FTM) request message to said responder station to request to perform an FTM measurement procedure with the responder station, the FTM request message comprising said initiator security token.

13. The apparatus of claim 12, wherein the initiator security token is based on an address of said initiator station.

14. The apparatus of claim 12 configured to cause the initiator station to process an FTM measurement frame received from said responder station, the FTM measurement frame is in response to said FTM request message.

15. The apparatus of claim 14, wherein the FTM measurement frame comprises a responder security token.

16. The apparatus of claim 15 configured to cause the initiator station to authenticate said responder station, based on said responder security token.

17. The apparatus of claim 16 configured to cause the initiator station to select to discontinue the FTM measurement procedure with said responder station, when said responder station is not successfully authenticated.

18. The apparatus of claim 15, wherein the responder security token is based on said initiator security token.

19. The apparatus of claim 12 comprising one or more antennas, a memory, and a processor.

20. A product including one or more tangible computer-readable non-transitory storage media comprising computer-executable instructions operable to, when executed by at least one computer processor, enable the at least one computer processor to implement operations at a responder station, the operations comprising:
   processing a Fine Timing Measurement (FTM) request message received from an initiator station, the FTM request message comprising a challenge token;
   determining a security token based on said challenge token; and
   transmitting an FTM measurement frame to said initiator station, the FTM measurement frame comprising said security token.

21. The product of claim 20, wherein the operations comprise determining said security token based on shared key information shared between the initiator station and the responder station.

22. The product of claim 20, wherein the operations comprise determining a challenge value by decrypting the challenge token, and transmitting said FTM measurement frame including said challenge value.

23. A product including one or more tangible computer-readable non-transitory storage media comprising computer-executable instructions operable to, when executed by at least one computer processor, enable the at least one computer processor to implement operations at a responder station, the operations comprising:
   processing a Fine Timing Measurement (FTM) request message received from an initiator station, the FTM request message comprising an initiator security token;
   authenticating said initiator station based on said initiator security token; and
   transmitting to said initiator station an FTM measurement frame, only if said initiator station is successfully authenticated.

24. The product of claim 23, wherein the FTM measurement frame comprises a responder security token.

25. The product of claim 24, wherein the responder security token and the initiator security token are based on shared key information shared between the initiator station and the responder station.

* * * * *